United States Patent
Shinkaji et al.

(10) Patent No.: US 12,205,403 B2
(45) Date of Patent: Jan. 21, 2025

(54) FINGERPRINT AUTHENTICATION DEVICE AND ELECTRONIC DEVICE INCLUDING THE SAME

(71) Applicant: Samsung Display Co., LTD., Yongin-si (KR)

(72) Inventors: Yasuhiko Shinkaji, Yokohama (JP); Masahiko Yoshiyama, Yokohama (JP)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/380,874

(22) Filed: Oct. 17, 2023

(65) Prior Publication Data
US 2024/0265728 A1    Aug. 8, 2024

(30) Foreign Application Priority Data
Feb. 3, 2023    (KR) .......................... 10-2023-0014671

(51) Int. Cl.
*G06V 40/12* (2022.01)
*G06V 10/24* (2022.01)
(Continued)

(52) U.S. Cl.
CPC ........ *G06V 40/1359* (2022.01); *G06V 10/242* (2022.01); *G06V 10/26* (2022.01); *G06V 10/34* (2022.01); *G06V 10/36* (2022.01); *G06V 10/82* (2022.01); *G06V 10/993* (2022.01); *G06V 40/1335* (2022.01); *G06V 40/1376* (2022.01)

(58) Field of Classification Search
None
See application file for complete search history.

(56) References Cited

U.S. PATENT DOCUMENTS

| 6,118,891 A | 9/2000 | Funada |
| 9,235,746 B2 | 1/2016 | Jung et al. |

(Continued)

FOREIGN PATENT DOCUMENTS

| EP | 3142044 A1 * | 3/2017 | ......... G06K 9/00006 |
| JP | 2739856 B2 | 4/1998 | |

(Continued)

OTHER PUBLICATIONS

Joshi, et al., FDeblur-GAN: Fingerprint Deblurring using Generative Adversarial Network, 2021 IEEE International Joint Conference on Biometrics, pp. 1-8, Jun. 21, 2021.

*Primary Examiner* — Benjamin X Casarez
(74) *Attorney, Agent, or Firm* — CANTOR COLBURN LLP

(57) ABSTRACT

An electronic device includes: a display unit which displays an image; a fingerprint sensing unit that senses a fingerprint including a ridge and a valley and outputs a fingerprint sensing signal including a fingerprint image, a readout circuit which generates a fingerprint processing signal based on the fingerprint sensing signal and determines whether the fingerprint processing signal matches a stored fingerprint signal, by comparing the fingerprint processing signal with the stored fingerprint signal, and a memory connected to the readout circuit. The readout circuit includes an area division unit, an estimation unit, a first sharpening processing unit, a second sharpening processing unit, and a processing unit.

20 Claims, 29 Drawing Sheets

(51) Int. Cl.
    *G06V 10/26*     (2022.01)
    *G06V 10/34*     (2022.01)
    *G06V 10/36*     (2022.01)
    *G06V 10/82*     (2022.01)
    *G06V 10/98*     (2022.01)

(56) References Cited

U.S. PATENT DOCUMENTS

| | | | |
|---|---|---|---|
| 9,934,371 | B2 | 4/2018 | Hong et al. |
| 10,198,612 | B1* | 2/2019 | Hsu .......................... G06T 3/18 |
| 11,443,542 | B2 | 9/2022 | Chen et al. |
| 2009/0245597 | A1* | 10/2009 | Toyama ............. G06V 40/1376 |
| | | | 382/125 |
| 2017/0220836 | A1* | 8/2017 | Phillips ..................... G06T 7/74 |
| 2018/0005031 | A1* | 1/2018 | Chen ................. G06V 40/1318 |
| 2019/0213383 | A1* | 7/2019 | Matsunami ........ G06V 40/1353 |
| 2021/0334495 | A1 | 10/2021 | Lee et al. |
| 2023/0281762 | A1* | 9/2023 | Nasrabadi .......... G06V 40/1347 |
| | | | 382/100 |
| 2023/0326187 | A1* | 10/2023 | Naresh ................... G06V 10/82 |
| | | | 382/124 |

FOREIGN PATENT DOCUMENTS

| KR | 1020150034832 A | 4/2015 |
|---|---|---|
| KR | 102212632 B1 | 2/2021 |
| KR | 1020210131513 A | 11/2021 |

\* cited by examiner

FINGERPRINT AUTHENTICATION DEVICE AND ELECTRONIC DEVICE INCLUDING THE SAME

This application claims priority under to Korean Patent Application No. 10-2023-0014671 filed on Feb. 3, 2023, and all the benefits accruing therefrom under 35 U.S.C. § 119, the content of which in its entirety is herein incorporated by reference.

BACKGROUND

Embodiments of the present disclosure described herein relate to an electronic device, and more particularly, relate to an electronic device having a fingerprint authentication function.

Each of multimedia devices such as a TV, a mobile phone, a tablet personal computer ("PC"), a navigation system, a game console, and the like includes an electronic device that displays an image. In addition to a general input method such as a button, a keyboard, a mouse, or the like, electronic devices may include an electronic device capable of providing a touch-based input method that allows a user to enter information or commands easily and intuitively.

Nowadays, a method using a fingerprint, which is one of biometric information, has been proposed as a user authentication means for online banking, product purchase, security, or the like. The demand for an electronic device having a fingerprint authentication function is increasing.

SUMMARY

Embodiments of the present disclosure provide a fingerprint authentication device with improved reliability, and an electronic device including the same.

According to an embodiment, a fingerprint authentication device includes: a fingerprint sensing unit which senses a fingerprint including a ridge and a valley and outputs a fingerprint sensing signal including a fingerprint image, and a readout circuit which generates a fingerprint processing signal based on the fingerprint sensing signal and determines whether the fingerprint processing signal matches a stored fingerprint signal, by comparing the fingerprint processing signal with the stored fingerprint signal. The readout circuit includes an area division unit which divides at least part of the fingerprint image into a plurality of split images and outputs the plurality of split images, a ridge-direction-component extraction unit which converts a 2-dimensional ("2D") signal of one split image among the plurality of split images into a 1-dimensional ("1D") signal and outputs the 1D signal, an estimation unit which estimates a fingerprint feature including a first feature including the ridge extending in a specific direction or a second feature including minutiae of the fingerprint based on the 1D signal and to output an estimation signal including the fingerprint feature, a first sharpening processing unit which outputs a first image by sharpening the one split image in a first method when the fingerprint feature is the first feature, a second sharpening processing unit which outputs a second image by sharpening the one split image in a second method different from the first method when the fingerprint feature is the second feature, and a processing unit which determines whether the fingerprint sensing signal matches the stored fingerprint signal, based on the first image and the second image.

The ridge-direction-component extraction unit may set a predetermined area including the one split image and may extract the 1D signal to be provided in plurality by rotating the predetermined area multiple times at a predetermined angle about a center of the predetermined area.

The estimation unit may further estimate angle information of the specific direction and image-quality information of the one split image. The estimation signal may further include the angle information and the image-quality information.

The estimation unit may include a convolutional neural network ("CNN") layer.

The first sharpening processing unit may include a convolutional neural network, a deconvolutional neural network, and a weight determination unit.

The weight determination unit may determine a weight based on the image-quality information.

The second sharpening processing unit may include an image cutting unit, a sharpening processing core unit which adjusts a parameter of sharpening processing based on the image-quality information, and an image re-cutting unit.

The image cutting unit may set a predetermined slope area including the one split image based on the angle information and may output a cutting image by setting a ridge direction of the slope area to be horizontal.

The sharpening processing core unit may include a smoothing processing unit which performs smoothing processing which reduces noise of the cutting image in a horizontal direction of the cutting image and outputs a horizontal smoothing image and a sharpening processing unit which outputs a sharpening image by performing sharpening processing based on the parameter in a vertical direction of the horizontal smoothing image.

The image re-cutting unit may output the second image corresponding to the one split image based on the sharpening image.

The fingerprint authentication device may further include a memory connected to the readout circuit. The first image and the second image may be stored in a buffer image stored in the memory.

The processing unit may generate the fingerprint processing signal by synthesizing the first image and the second image.

According to an embodiment, an electronic device includes: a display unit which displays an image, a fingerprint sensing unit which senses a fingerprint including a ridge and a valley and outputs a fingerprint sensing signal including a fingerprint image, a readout circuit which generates a fingerprint processing signal based on the fingerprint sensing signal and determines whether the fingerprint processing signal matches a stored fingerprint signal, by comparing the fingerprint processing signal with the stored fingerprint signal, and a memory connected to the readout circuit. The readout circuit includes an area division unit which divides at least part of the fingerprint image into a plurality of split images and outputs one split image among the plurality of split images, a ridge-direction-component extraction unit which converts a 2D signal of the one split image into a 1D signal and outputs the 1D signal, an estimation unit which estimates a fingerprint feature including a first feature including the ridge extending in a specific direction or a second feature including minutiae of the fingerprint based on the 1D signal and outputs an estimation signal including the fingerprint feature, a first sharpening processing unit which outputs a first image by sharpening the one split image in a first method when the fingerprint feature is the first feature, a second sharpening processing unit which outputs a second image by sharpening the one split image in a second method different from the first method when the fingerprint feature is the second feature, and a processing unit which determines whether the fingerprint sensing signal matches the stored fingerprint signal, based on the first image and the second image.

The ridge-direction-component extraction unit may set a predetermined area including the one split image and may extract the 1D signal to be provided in plurality by rotating the predetermined area multiple times at a predetermined angle about a center of the predetermined area.

The estimation unit may further estimate angle information of the specific direction and image-quality information of the one split image. The estimation signal may further include the angle information and the image-quality information.

The estimation unit may include a CNN layer.

The first sharpening processing unit may include a convolutional neural network, a deconvolutional neural network, and a weight determination unit. The weight determination unit may determine a weight based on the image-quality information.

The second sharpening processing unit may include an image cutting unit which sets a predetermined slope area including the one split image based on the angle information and outputs a cutting image by setting a ridge direction of the slope area to be horizontal, a sharpening processing core unit which adjusts a parameter of sharpening processing based on the image-quality information, performs smoothing processing which reduces noise of the cutting image in a horizontal direction of the cutting image, performs sharpening processing based on the parameter in a vertical direction of the cutting image, and outputs a sharpening image, and an image re-cutting unit which outputs the second image corresponding to the one split image based on the sharpening image.

The first image and the second image may be stored in the memory.

The processing unit may generate the fingerprint processing signal by synthesizing the first image and the second image.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
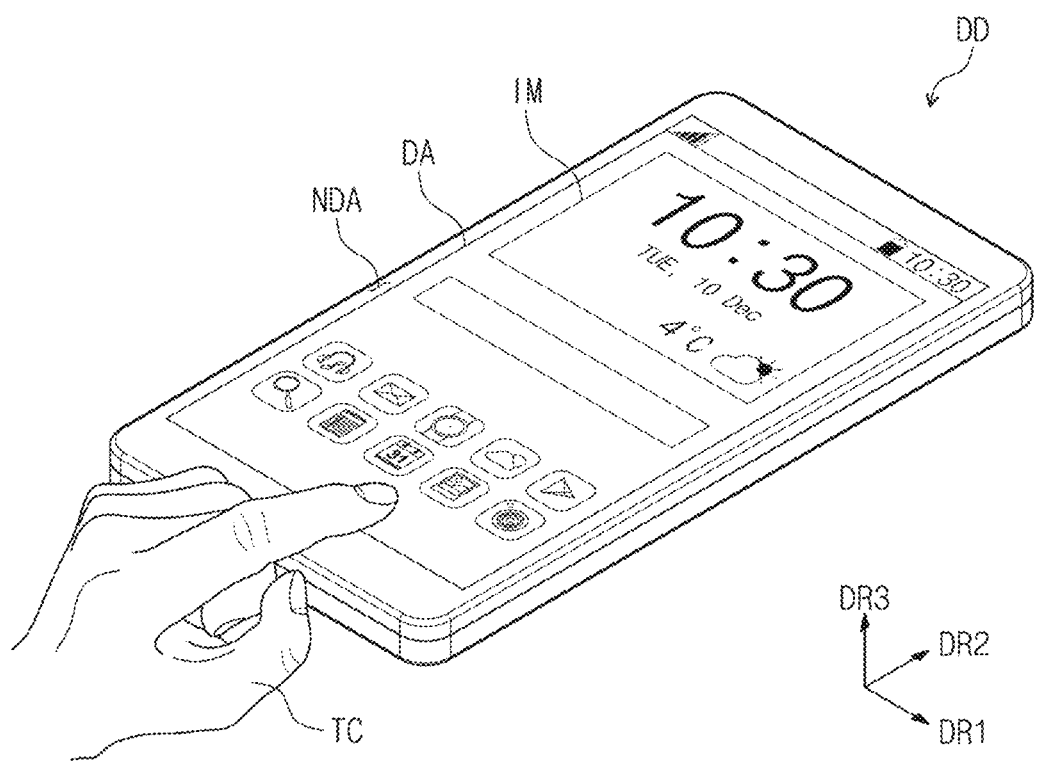
FIG. 1 is a perspective view of an electronic device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a perspective view of an electronic device, according to an embodiment of the present disclosure.

Referring to FIG. 1, a portable terminal is illustrated as an example of an electronic device DD according to an embodiment of the present disclosure. The portable terminal may include a tablet PC, a smartphone, a personal digital assistant ("PDA"), a portable multimedia player ("PMP"), a game console, a wristwatch-type electronic device, and the like. However, the present disclosure is not limited thereto. The present disclosure may be used for small and medium electronic devices such as a personal computer, a notebook computer, a kiosk, a car navigation unit, and a camera, in addition to large-sized electronic equipment such as a television or an outside billboard. The examples are provided only as an embodiment, and it is obvious that the examples may be applied to any other electronic device(s) without departing from the concept of the present disclosure.

As shown in FIG. 1, a display surface, on which an image IM is displayed, may be parallel to a plane defined by a first direction DR1 and a second direction DR2. The electronic device DD includes areas separated on the display surface. The display surface includes a display area DA, in which the image IM is displayed, and a non-display area NDA adjacent to the display area DA. The non-display area NDA may be referred to as a bezel area. For example, the display area DA may have a rectangular shape. The non-display area NDA surrounds the display area DA. Also, although not illustrated, for example, the electronic device DD may include a shape thus partially curved. As a result, one area of the display area DA may have a curved shape.

A front surface (alternatively, an upper surface or a first surface) and a rear surface (alternatively, a lower surface or a second surface) of each of members are defined in a direction in which the image IM is displayed, that is, the third direction DR3. However, directions that the first, second, and third directions DR1, DR2, and DR3 indicate may be relative in concept and may be changed to different directions.

The electronic device DD according to an embodiment of the present disclosure may detect an externally-applied user input TC. The user input includes various external inputs such as a touch of a part of a user's body, light, heat, pressure, or the like. In an embodiment, it is assumed that the user input is a user's hand applied to a front surface, but it is an example. As described above, the user input TC may be provided in various input schemes. Also, the electronic device DD may sense an input of the user applied to a side surface or a rear surface of the electronic device DD depending on a structure of the electronic device DD and is not limited to an embodiment.

Figure 2:
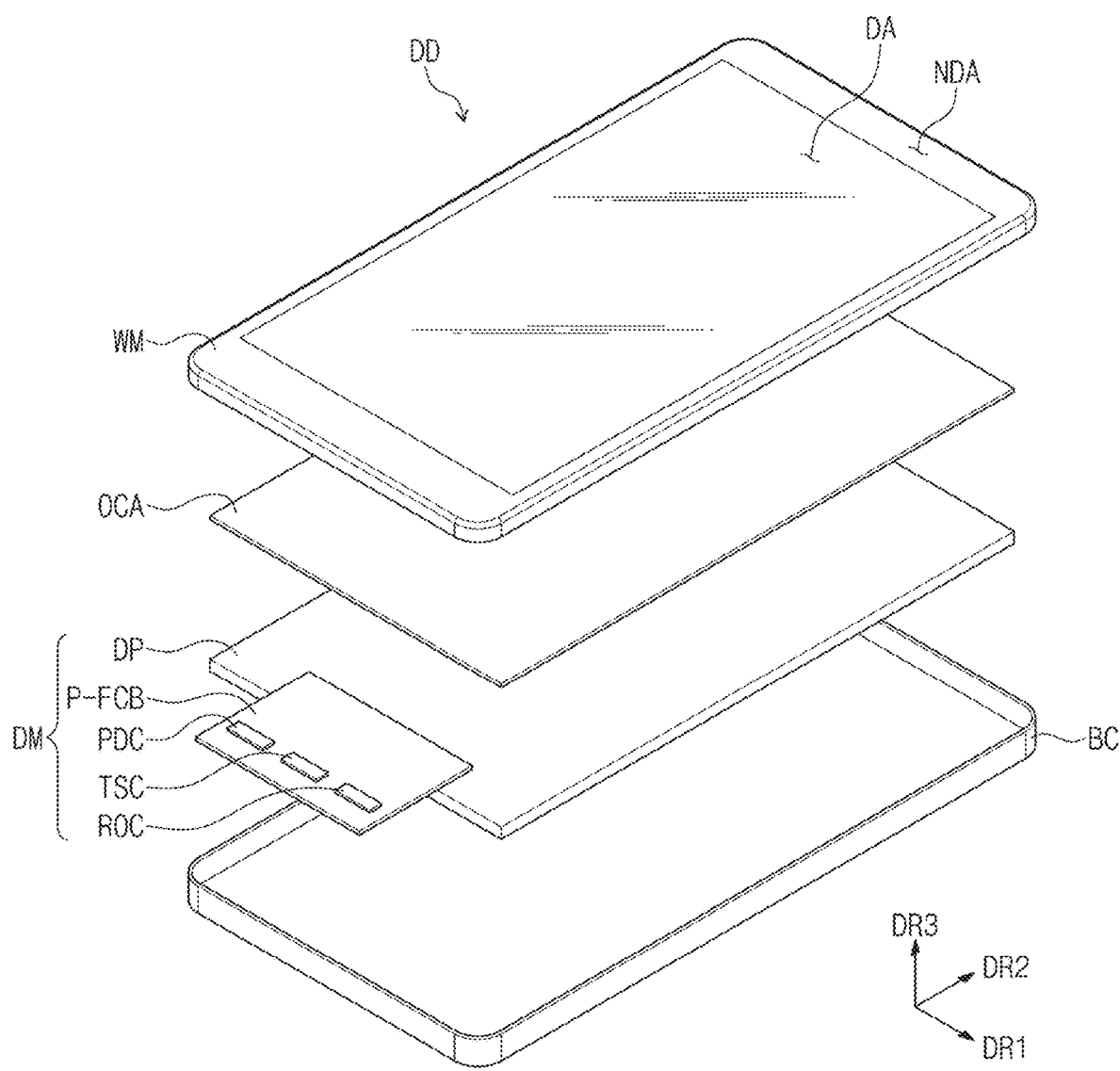
FIG. 2 is an exploded perspective view of an electronic device, according to an embodiment of the present disclosure.

FIG. 2 is an exploded perspective view of an electronic device, according to an embodiment of the present disclosure.

Referring to FIG. 2, the electronic device DD includes a window member WM, an adhesive member OCA, a display module DM, and a lower case BC. The display module DM includes a display panel DP, a panel circuit board P-FCB, a panel driving circuit PDC, a touch detection circuit TSC, and a readout circuit.

The window member WM provides a front surface of the electronic device DD shown in FIG. 1. The window member WM may include a glass substrate, a sapphire substrate, or a plastic substrate. In addition, the window member WM may include a functional coating layer such as an anti-fingerprint layer, an anti-reflection layer, and a hard coating layer. In an embodiment, the window member WM in a flat form may be shown in the display area DA, but the shape of the window member WM may be modified. Edges facing in the first direction DR1 of the window member WM may be provided to have a curved surface.

The display panel DP is positioned on the back surface of the window member WM to create an image. Moreover, the display panel DP may detect the user input TC (see FIG. 1), for example, an input by a user's touch and/or a user's pressure. In an embodiment, the display panel DP providing a flat display surface may be shown, but the shape of the display panel DP may be modified. Edges of the display panel DP facing each other in the first direction DR1 may be bent to provide a curved surface.

The display panel DP according to an embodiment of the present disclosure may be a light emitting display panel, but is not particularly limited thereto. For example, the display panel DP may be an organic light emitting display panel, a quantum dot light emitting display panel, a micro-LED display panel, or a nano-LED display panel. A light emitting layer of the organic light emitting display panel may include an organic light emitting material. A light emitting layer of the quantum dot light emitting display panel may include a quantum dot, a quantum rod, or the like. A light emitting layer of the micro-LED display panel may include a micro-LED. A light emitting layer of the nano-LED display panel may include a nano-LED.

Although not shown in FIG. 2, the display panel DP may include a display unit that outputs an image, a touch sensing unit that detects the user input TC (see FIG. 1), and a fingerprint sensing unit that detects a fingerprint by the user input TC (see FIG. 1).

The adhesive member OCA is interposed between the window member WM and the display panel DP. The adhesive member OCA may be an optically transparent adhesive member.

One end of the panel circuit board P-FCB may be bonded to pads (not shown) disposed in one area of the display panel DP to be electrically connected to the display panel DP. According to an embodiment, the panel driving circuit PDC, a touch sensing circuit TSC, and a readout circuit ROC may be mounted on the panel circuit board P-FCB in a chip-on-film ("COF") method. Although not separately shown, a plurality of passive elements and a plurality of active elements may be further mounted on the panel circuit board P-FCB. The panel circuit board P-FCB may provide electrical signals to the display panel DP through signal lines. The panel circuit board P-FCB may be implemented as a flexible printed circuit. The other end of the panel circuit board P-FCB may be electrically connected to other components of the electronic device DD (shown in FIG. 1).

The lower case BC may be disposed under the display panel DP. A space for accommodating the display panel DP and the panel circuit board P-FCB may be provided between the lower case BC and the window member WM.

Figure 3:
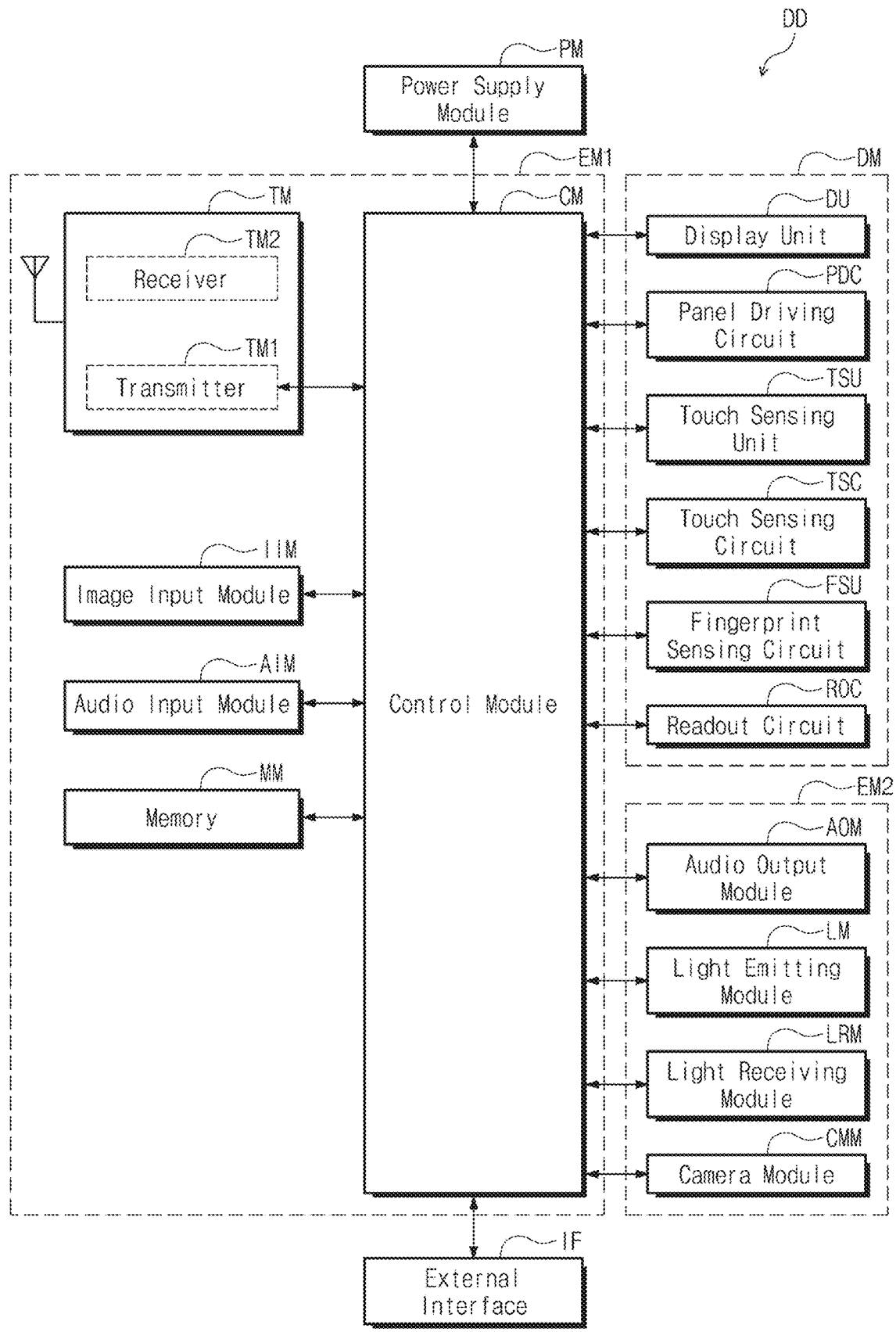
FIG. 3 is a block diagram of an electronic device, according to an embodiment of the present disclosure.

FIG. 3 is a block diagram of an electronic device, according to an embodiment of the present disclosure.

Referring to FIG. 2, the electronic device DD may include the display module DM, a power supply module PM, a first electronic module EM1, and a second electronic module EM2. The display module DM, the power supply module PM, the first electronic module EM1, and the second electronic module EM2 may be electrically connected to one another.

FIG. 3 shows a display unit DU, the panel driving circuit PDC, a touch sensing unit TSU, the touch sensing circuit TSC, a fingerprint sensing unit FSU, and the readout circuit ROC among components of the display module DM.

The display unit DU, the touch sensing unit TSU, and the fingerprint sensing unit FSU may constitute the display panel DP shown in FIG. 2. That is, each of the display unit DU, the touch sensing unit TSU, and the fingerprint sensing unit FSU may be of a "layer" type.

In another embodiment, each of the display unit DU, the touch sensing unit TSU, and the fingerprint sensing unit FSU may be of a "panel" type. A component of the "panel" type includes a base layer providing a base surface, such as a synthetic resin film, a composite film, a glass substrate, or the like. However, the base layer may be omitted in a component of the "layer" type. In other words, the display unit DU, the touch sensing unit TSU, and the fingerprint sensing unit FSU of the "layer" type may be sequentially stacked on one base layer. The stacking order of the display unit DU, the touch sensing unit TSU, and the fingerprint sensing unit FSU of the "layer" type may be variously changed.

Each of the display unit DU, the touch sensing unit TSU, and the fingerprint sensing unit FSU of the "panel" type may be composed of an independent panel and may be coupled to each other by an adhesive member. The coupling order of the display unit DU, the touch sensing unit TSU, and the fingerprint sensing unit FSU of the "panel" type may be variously changed.

Under control of the panel driving circuit PDC, an image may be displayed on the display unit DU. In an embodiment, under control of the panel driving circuit PDC, an image may be displayed on the display unit DU in response to a control signal and an image signal provided from a control module CM. Moreover, the panel driving circuit PDC may control operations of the touch sensing circuit TSC and the readout circuit ROC.

The touch sensing circuit TSC may sense a location of the user input TC (see FIG. 1) by receiving a touch sensing signal from the touch sensing unit TSU.

The readout circuit ROC may detect a fingerprint from the user input TC (see FIG. 1) by receiving a fingerprint sensing signal from the fingerprint sensing unit FSU and may determine whether the detected fingerprint matches the stored fingerprint. The readout circuit ROC may provide the panel driving circuit PDC and/or the control module CM with a signal indicating whether the detected fingerprint matches the stored fingerprint. The specific configuration and operation of the readout circuit ROC will be described in detail later.

As shown in FIG. 2, the panel driving circuit PDC, the touch sensing circuit TSC and the readout circuit ROC may be integrated on the panel circuit board P-FCB. In an embodiment, the panel driving circuit PDC, the touch sensing circuit TSC, and the readout circuit ROC may be integrated on different circuit boards and may be electrically connected to each other through a connection board.

In an embodiment, the fingerprint sensing unit FSU and the readout circuit ROC may be configured as fingerprint authentication devices independent of the display module DM.

The power supply module PM supplies a power necessary for the overall operation of the electronic device DD. The power supply module PM may include a general battery module.

Each of the first electronic module EM1 and the second electronic module EM2 includes various functional modules for operating the electronic device DD. The first electronic module EM1 may be directly mounted on a motherboard electrically connected to the display module DM or may be mounted on a separate board so as to be electrically connected to the motherboard through a connector (not illustrated).

The first electronic module EM1 may include a control module CM, a wireless communication module TM, an image input module IIM, an audio input module AIM, a memory MM, and an external interface IF. Some of the modules may be electrically connected to the motherboard through a flexible circuit board without being mounted on the motherboard.

The control module CM controls the overall operation of the electronic device DD. The control module CM may be a microprocessor. For example, the control module CM activates or deactivates the display module DM. The control module CM may control other modules such as the image input module IIM or the audio input module AIM based on a touch signal received from the display module DM. The control module CM may perform user authentication based on the fingerprint signal received from the fingerprint sensing unit FSU.

The wireless communication module TM may transmit/receive a wireless signal with another terminal by using Bluetooth or Wi-Fi. The wireless communication module TM may transmit/receive voice signals by using general communication lines. The wireless communication module TM includes a transmitter TM1, which modulates and transmits a signal to be transmitted, and a receiver TM2 that demodulates the received signal.

The image input module IIM converts an image signal into image data to be displayed on the display module DM by processing the image signal. The audio input module AIM may receive an external sound signal from a microphone in a recording mode and a speech recognition mode, or the like and then may convert the external sound signal into electrical voice data.

The external interface IF may operate as an interface that connects to an external charger, a wired/wireless data port, a card socket (e.g., a memory card, a SIM/UIM card, or the like), or the like.

The second electronic module EM2 may include an audio output module AOM, a light emitting module LM, a light receiving module LRM, and a camera module CMM. The configurations may be mounted directly on a motherboard, may be mounted on a separate board so as to be electrically connected to the display module DM through a connector (not illustrated), or may be electrically connected to the first electronic module EM1.

The audio output module AOM may convert audio data received from the wireless communication module TM or audio data stored in the memory MM and then may output the converted data to the outside.

The light emitting module LM generates and outputs light. The light emitting module LM may output infrared light. The light emitting module LM may include an LED element. The light receiving module LRM may detect the infrared light. When the infrared light having a predetermined level or more is detected, the light receiving module LRM may be activated. The light receiving module LRM may include a CMOS sensor. After the infrared light being generated by the light emitting module LM is output, the infrared light is reflected by an external object (e.g., a user's finger or face), and then the reflected infrared light may be incident on the light receiving module LRM. The camera module CMM may capture an external image.

Figure 4:
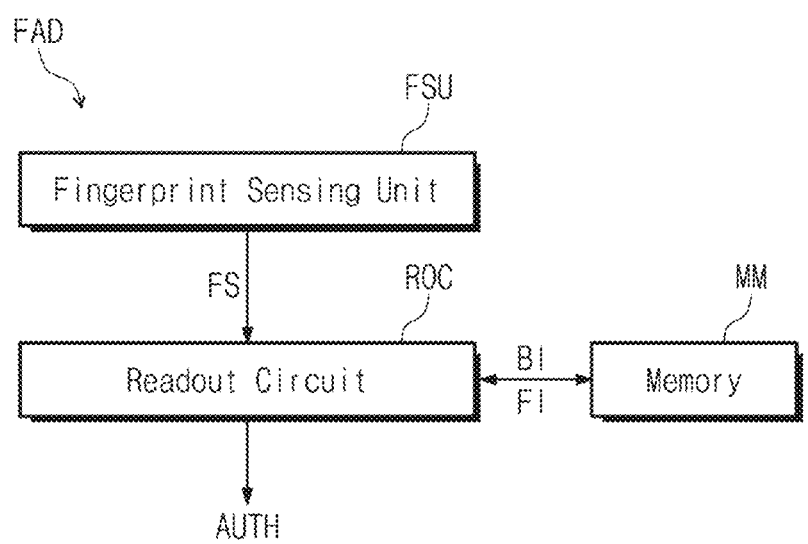
FIG. 4 is a block diagram illustrating a fingerprint authentication device, according to an embodiment of the present disclosure.

FIG. 4 is a block diagram illustrating a fingerprint authentication device, according to an embodiment of the present disclosure.

Referring to FIG. 4, a fingerprint authentication device FAD may include the fingerprint sensing unit FSU, the readout circuit ROC, and the memory MM. The fingerprint sensing unit FSU may detect a user's fingerprint and then may output a fingerprint sensing signal FS corresponding to the detected fingerprint.

The readout circuit ROC may receive the fingerprint sensing signal FS from the fingerprint sensing unit FSU. The readout circuit ROC and the memory MM may transmit and receive buffer images BI to each other. This will be described later. The memory MM may provide a fingerprint signal FI to the readout circuit ROC.

The readout circuit ROC may output a fingerprint authentication signal AUTH by determining whether the fingerprint sensing signal FS matches the fingerprint signal FI (see FIG. 4), which is previously stored. For example, when the fingerprint sensing signal FS matches the pre-stored fingerprint signal FI, the fingerprint authentication signal AUTH may be at a first level (e.g., a high level). When the fingerprint sensing signal FS does not match the pre-stored fingerprint signal FI, the fingerprint authentication signal AUTH may be at a second level (e.g., a low level).

The fingerprint authentication device FAD may be included in the electronic device DD shown in FIG. 1, but the present disclosure is not limited thereto. The fingerprint authentication device FAD may be applied to various electronic devices, which require user authentication, such as personal computers, door locks, navigation devices, safes, ATMs, and payment terminals.

Figure 5:
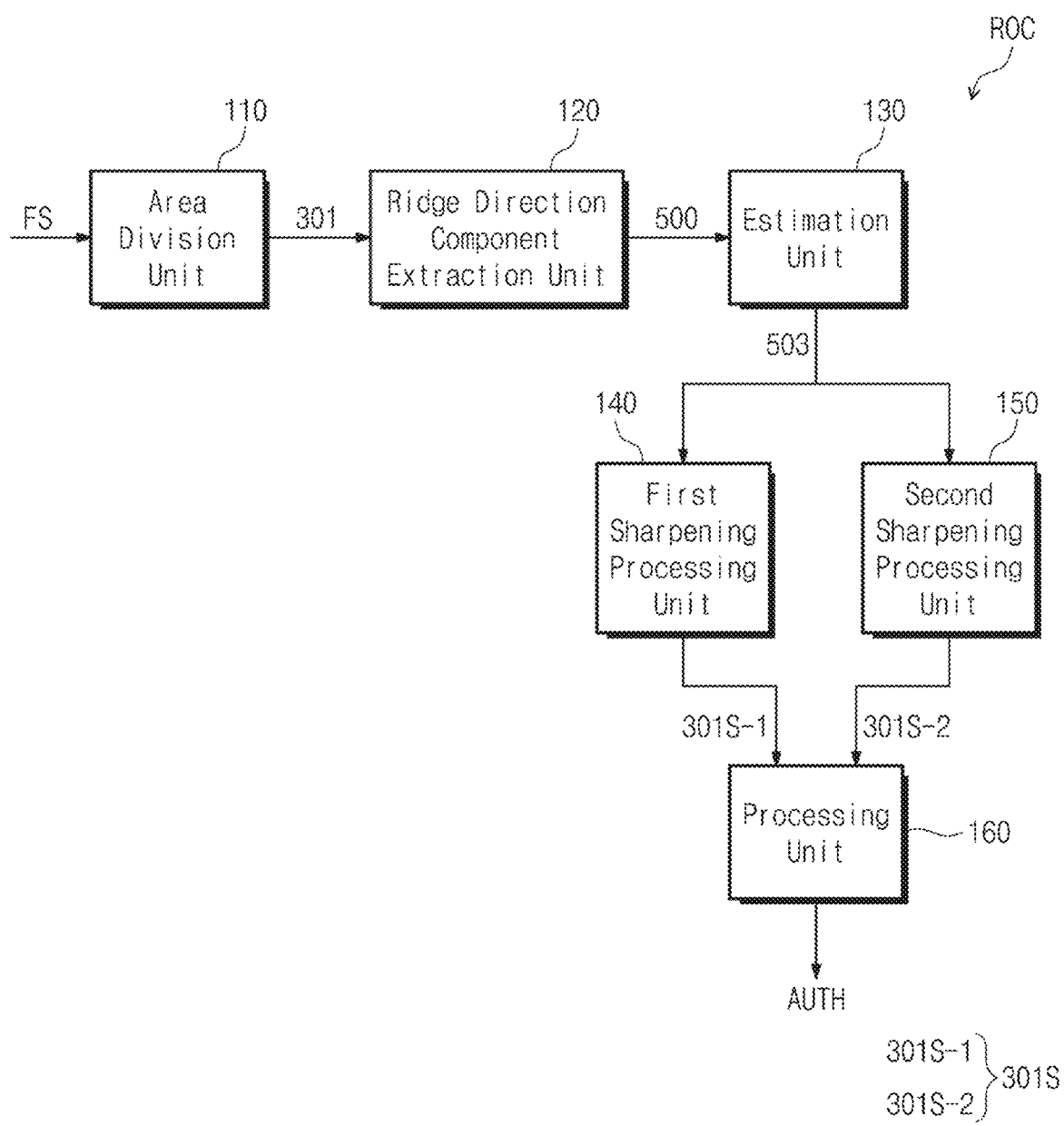
FIG. 5 is a block diagram illustrating a readout circuit, according to an embodiment of the present disclosure.
Figure 6A:
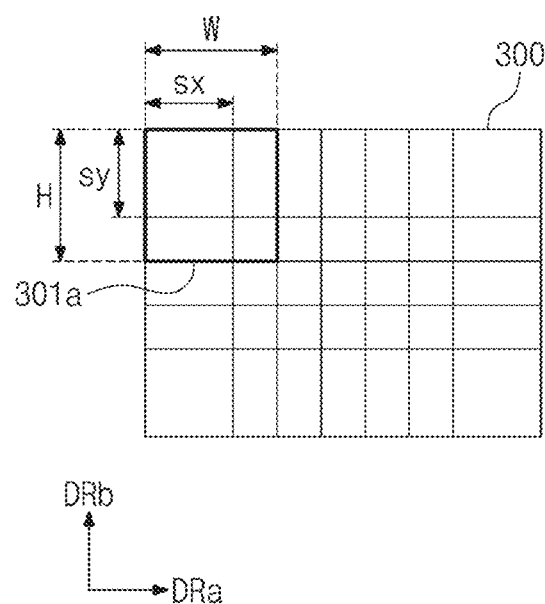
FIGS. 6A to 6L show split images for a fingerprint image, according to an embodiment of the present disclosure.
Figure 6B:
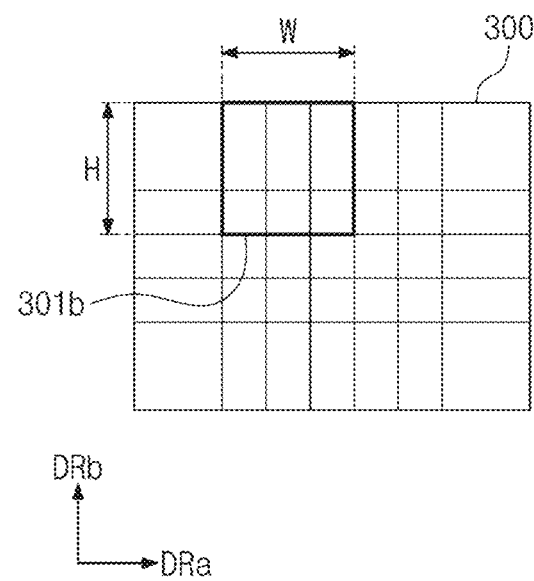
Figure 6C:
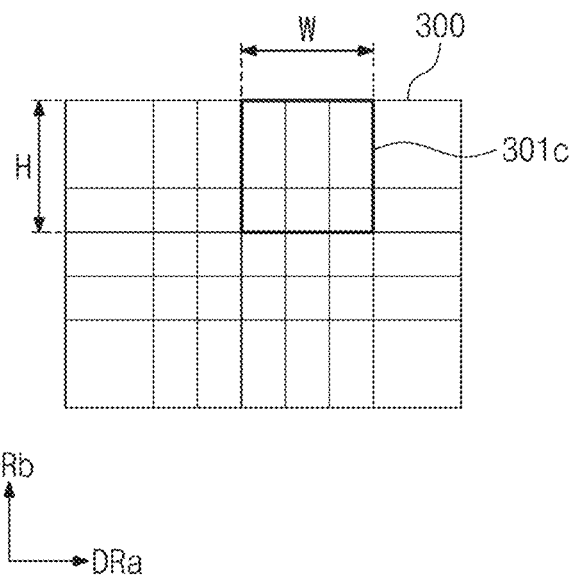
Figure 6D:
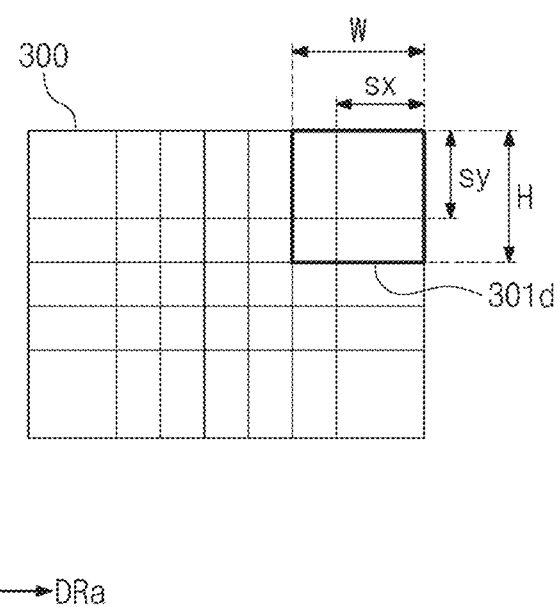
Figure 6E:
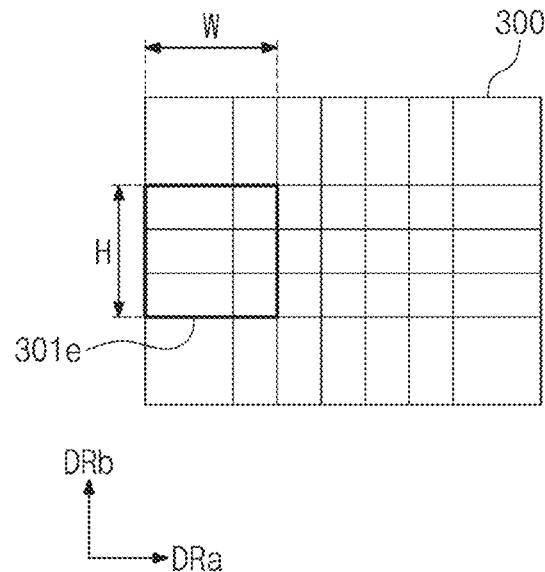
Figure 6F:
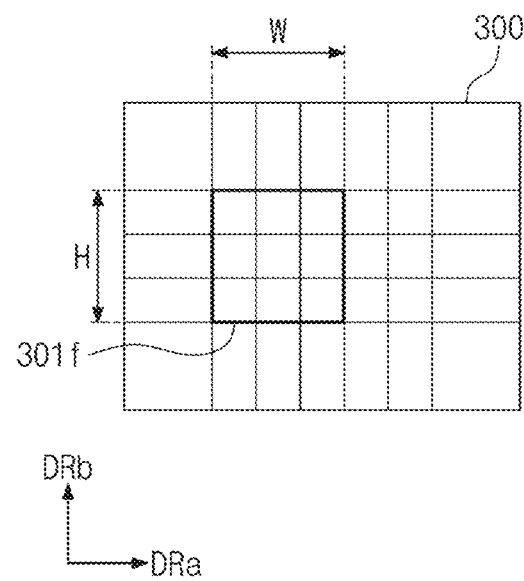
Figure 6G:
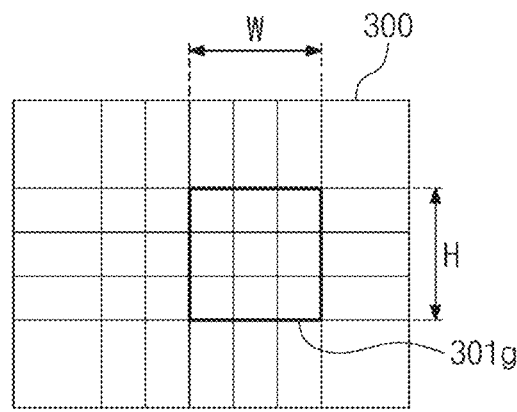
Figure 6G:
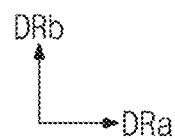
Figure 6H:
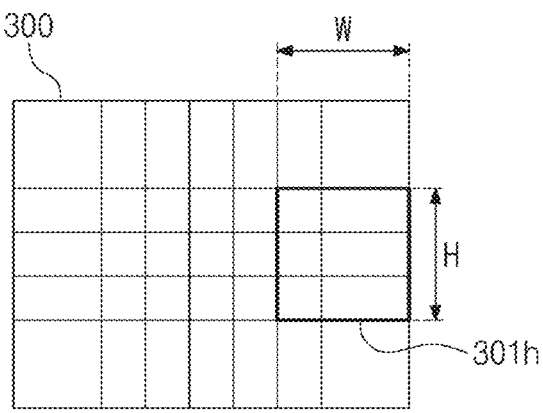
Figure 6H:
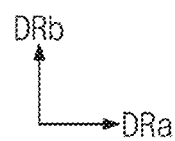
Figure 6I:
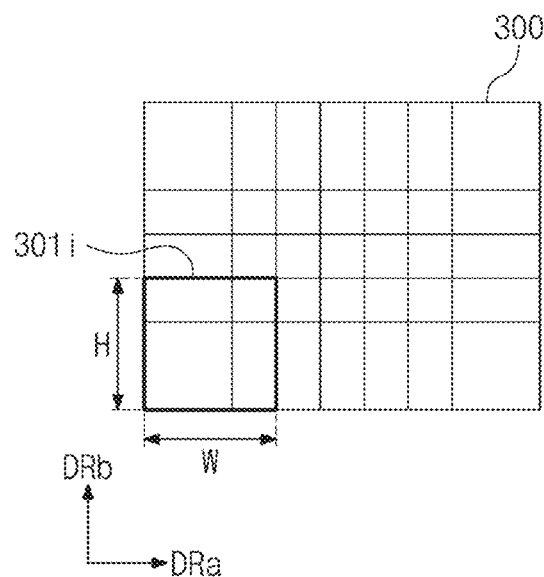
Figure 6J:
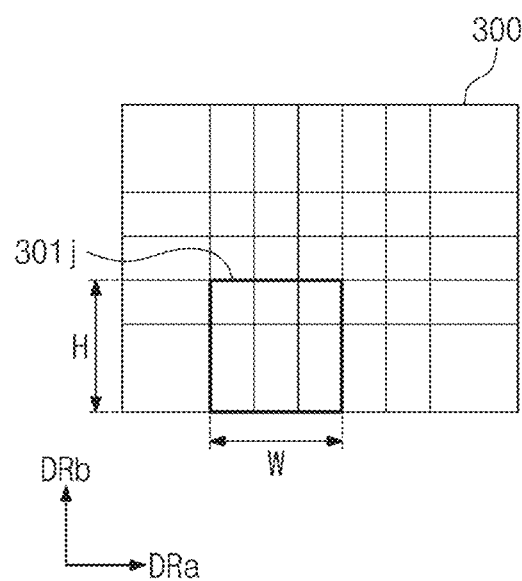
Figure 6K:
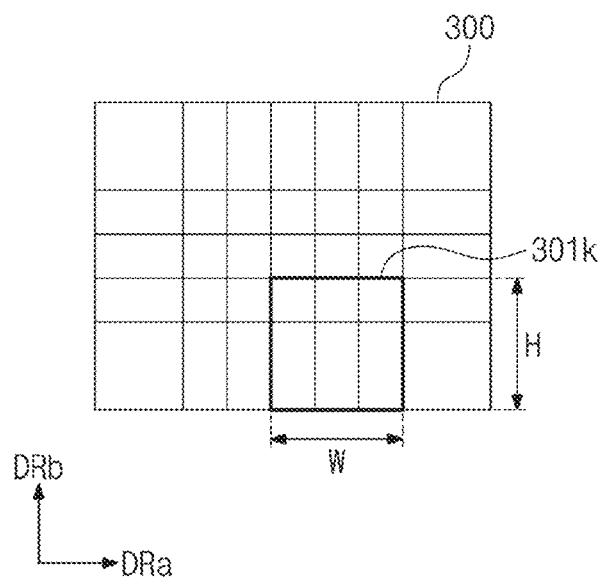
Figure 6L:
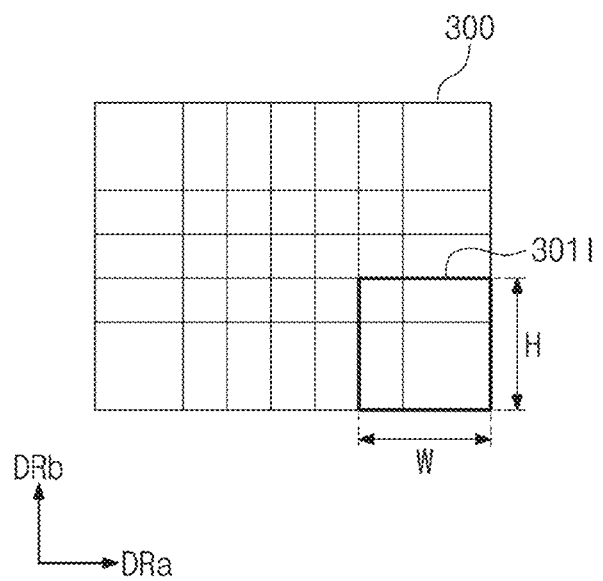

FIG. 5 is a block diagram illustrating a readout circuit, according to an embodiment of the present disclosure.

Referring to FIG. 5, the readout circuit ROC may include an area division unit 110, a ridge-direction-component extraction unit 120, an estimation unit 130, a first sharpening processing unit 140, a second sharpening processing unit 150, and a processing unit 160.

The area division unit 110 may receive the fingerprint sensing signal FS. The fingerprint sensing signal FS may include a fingerprint image 400 (see FIG. 7). The fingerprint image 400 (see FIG. 7) may be a fingerprint image from the user input TC (see FIG. 1) captured by the fingerprint sensing unit FSU (see FIG. 4).

The area division unit 110 may divide at least part of the fingerprint image 400 (see FIG. 7) into a plurality of split images. Each of the plurality of split images may be a part of the fingerprint image 400 (see FIG. 7). The area division unit 110 may output at least one split image 301 among the plurality of split images to the ridge-direction-component extraction unit 120.

The ridge-direction-component extraction unit 120 may receive the split image 301 from the area division unit 110. The ridge-direction-component extraction unit 120 may convert a 2-dimensional (2D) signal of the split image 301 into a plurality of 1-dimensional (1D) signals 500. The ridge-direction-component extraction unit 120 may output the plurality of 1D signals 500 to the estimation unit 130.

The estimation unit 130 may receive the plurality of 1D signals 500 from the ridge-direction-component extraction unit 120.

The user's fingerprint may include striped ridges and valleys. The fingerprint has two characteristics: immutability that a fingerprint does not change throughout life and non-identity that there are no two fingerprints having the same shape, and may be used as a method of specifying an individual. The fingerprint may include a fingerprint feature FC (see FIG. 11). The fingerprint feature FC (see FIG. 11) may include a first feature including a ridge extending in a specific direction, or a second feature including minutiae including central points, ridge ends of ridges, or bifurcations.

The estimation unit 130 may estimate whether the fingerprint feature FC (see FIG. 11) is the first feature or the second feature, based on the plurality of 1D signals 500. The estimation unit 130 may output an estimation signal 503 including the fingerprint feature FC (see FIG. 11).

When the fingerprint feature FC (see FIG. 11) included in the estimation signal 503 is the first feature, the first sharpening processing unit 140 may sharpen the split image 301 in a first method and may output a first image 301S-1 to the processing unit 160. The first method will be described later.

When the fingerprint feature FC (see FIG. 11) included in the estimation signal 503 is the second feature, the second sharpening processing unit 150 may sharpen the split image 301 in a second method and may output a second image 301S-2 to the processing unit 160. The second method may be different from the first method. The second method may have a smaller processing load of the readout circuit ROC than the first method. The second method will be described later.

Each of the first image and the second image may be referred to as a "sharpened image 301S". The sharpened image 301S may be provided to the memory MM (see FIG. 4) and may be stored in the buffer image BI (see FIG. 4). The plurality of sharpened images 301S may be stored in the buffer image BI (see FIG. 4) to correspond to the split images, respectively.

The processing unit 160 may determine whether the fingerprint sensing signal FS matches the stored fingerprint signal FI (see FIG. 4), based on the buffer image BI (see FIG. 4) where the sharpened image 301S is stored. The processing unit 160 may output the fingerprint authentication signal AUTH.

FIGS. 6A to 6L show split images for a fingerprint image, according to an embodiment of the present disclosure.

Referring to FIGS. 5 and 6A to 6L, a fingerprint area 300 may be an area defined in the fingerprint image 400 (see FIG. 7) to analyze a fingerprint image.

The area division unit 110 may divide the fingerprint area 300 into a plurality of split images 301a, 301b, 301c, 301d, 301e, 301f, 301g, 301h, 301i, 301j, 301k, and 310l. Each of the plurality of split images 301a, 301b, 301c, 301d, 301e, 301f, 301g, 301h, 301i, 301j, 301k, and 310l has a first length 'W' in a first plane direction DRa and may have a second length 'H' in a second plane direction DRb. The first plane direction DRa may cross the second plane direction DRb. As used herein, the first plane direction DRa may be parallel to two opposite sides of the split image 301, and the second plane direction DRb may be parallel to another two opposite sides of the split image 301. For example, when the first length 'W' is equal to the second length 'H', each of the plurality of split images 301a, 301b, 301c, 301d, 301e, 301f, 301g, 301h, 301i, 301j, 301k, and 310l may have a square shape. However, this is an example. For another example, each of the first length 'W' and the second length 'H' according to an embodiment of the present disclosure may be adjusted depending on the size of stripe shape of a fingerprint.

The plurality of split images 301a, 301b, 301c, 301d, 301e, 301f, 301g, 301h, 301i, 301j, 301k, and 310l may include the first split image 301a, the second split image 301b, the third split image 301c, the fourth split image 301d, the fifth split image 301e, the sixth split image 301f, the seventh split image 301g, the eighth split image 301h, the ninth split image 301i, the tenth split image 301j, the eleventh split image 301k, and the twelfth split image 301l.

The readout circuit ROC may output the estimation signal 503 for the first split image 301a output from the area division unit 110 through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the first split image 301a may be stored in an area corresponding to the first split image 301a of the buffer image BI of the memory MM and then may be provided to the processing unit 160.

When the readout circuit ROC completely processes the first split image 301a, the area division unit 110 may move the first split image 301a in the first plane direction DRa by a first stride sx and then may output the second split image 301b. The length of the first stride sx according to an embodiment of the present disclosure may be adjusted depending on the size of stripe shape of a fingerprint.

The readout circuit ROC may output the estimation signal 503 for the second split image 301b through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the second split image 301b may be stored in an area corresponding to the second split image 301b of the buffer image BI of the memory MM and then may be provided to the processing unit 160.

When the readout circuit ROC completely processes the second split image 301b, the area division unit 110 may move the second split image 301b in the first plane direction DRa by the first stride sx and then may output the third split image 301c.

The readout circuit ROC may output the estimation signal 503 for the third split image 301c through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the third split image 301c may be stored in an area corresponding to the third split image 301c of the buffer image BI of the memory MM and then may be provided to the processing unit 160.

When the readout circuit ROC completely processes the third split image 301c, the area division unit 110 may move the third split image 301c in the first plane direction DRa by the first stride sx and then may output the fourth split image 301d.

The readout circuit ROC may output the estimation signal 503 for the fourth split image 301d through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the fourth split image 301d may be stored in an area corresponding to the fourth split image 301d of the buffer image BI of the memory MM and then may be provided to the processing unit 160.

When the readout circuit ROC completely processes the fourth split image 301d, the area division unit 110 may move the first split image 301a in a direction opposite to the second plane direction DRb by a second stride sy and then may output the fifth split image 301e. The length of the second stride sy according to an embodiment of the present disclosure may be adjusted depending on the size of stripe shape of a fingerprint.

The readout circuit ROC may output the estimation signal 503 for the fifth split image 301e through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the fifth split image 301e may be stored in an area corresponding to the fifth split image 301e of the buffer image BI of the memory MM and then may be provided to the processing unit 160.

When the readout circuit ROC completely processes the fifth split image 301e, the area division unit 110 may move the fifth split image 301e in a direction opposite to the first plane direction DRa by the first stride sx and then may output the sixth split image 301f.

The readout circuit ROC may output the estimation signal 503 for the sixth split image 301f through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the sixth split image 301f may be stored in an area corresponding to the sixth split image 301f of the buffer image BI of the memory MM and then may be provided to the processing unit 160.

When the readout circuit ROC completely processes the sixth split image 301f, the area division unit 110 may move the sixth split image 301f in the first plane direction DRa by the first stride sx and then may output the seventh split image 301g.

The readout circuit ROC may output the estimation signal 503 for the seventh split image 301g through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the seventh split image 301g may be stored in an area corresponding to the seventh split image 301g of the buffer image BI of the memory MM and then may be provided to the processing unit 160.

When the readout circuit ROC completely processes the seventh split image 301g, the area division unit 110 may move the seventh split image 301g in the first plane direction DRa by the first stride sx and then may output the eighth split image 301h.

The readout circuit ROC may output the estimation signal 503 for the eighth split image 301h through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the eighth split image 301h may be stored in an area corresponding to the eighth split image 301h of the buffer image BI of the memory MM and then may be provided to the processing unit 160.

When the readout circuit ROC completely processes the eighth split image 301h, the area division unit 110 may move the fifth split image 301e in a direction opposite to the second plane direction DRb by the second stride sy and then may output the ninth split image 301i.

The readout circuit ROC may output the estimation signal 503 for the ninth split image 301i through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the ninth split image 301i may be stored in an area corresponding to the ninth split image 301i of the buffer image BI of the memory MM and then may be provided to the processing unit 160.

When the readout circuit ROC completely processes the ninth split image 301i, the area division unit 110 may move the ninth split image 301i in a direction opposite to the first plane direction DRa by the first stride sx and then may output the tenth split image 301j.

The readout circuit ROC may output the estimation signal 503 for the tenth split image 301j through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the tenth split image 301j may be stored in an area corresponding to the tenth split image 301j of the buffer image BI of the memory MM and then may be provided to the processing unit 160.

When the readout circuit ROC completely processes the tenth split image 301j, the area division unit 110 may move the tenth split image 301j in a direction opposite to the first plane direction DRa by the first stride sx and then may output the eleventh split image 301k.

The readout circuit ROC may output the estimation signal 503 for the eleventh split image 301k through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the eleventh split image 301k may be stored in an area corresponding to the eleventh split image 301k of the buffer image BI of the memory MM and then may be provided to the processing unit 160.

When the readout circuit ROC completely processes the eleventh split image 301k, the area division unit 110 may move the eleventh split image 301k in the first plane direction DRa by the first stride sx and then may output the twelfth split image 301l.

The readout circuit ROC may output the estimation signal 503 for the twelfth split image 301l through the ridge-direction-component extraction unit 120 and the estimation unit 130 and then may output the image 301S sharpened from the first sharpening processing unit 140 or the second sharpening processing unit 150 based on the estimation signal 503.

The sharpened image 301S output from the twelfth split image 301l may be stored in an area corresponding to the twelfth split image 301l of the buffer image BI of the memory MM and then may be provided to the processing unit 160.

FIGS. 6A to 6L show twelve split images, but the number of split images according to an embodiment of the present disclosure is not limited thereto. The number of a plurality of split images may be provided in various ways depending on sizes of the first length 'W', the second length 'H', the first stride sx, and the second stride sy adjusted by the area division unit 110.

Figure 7:
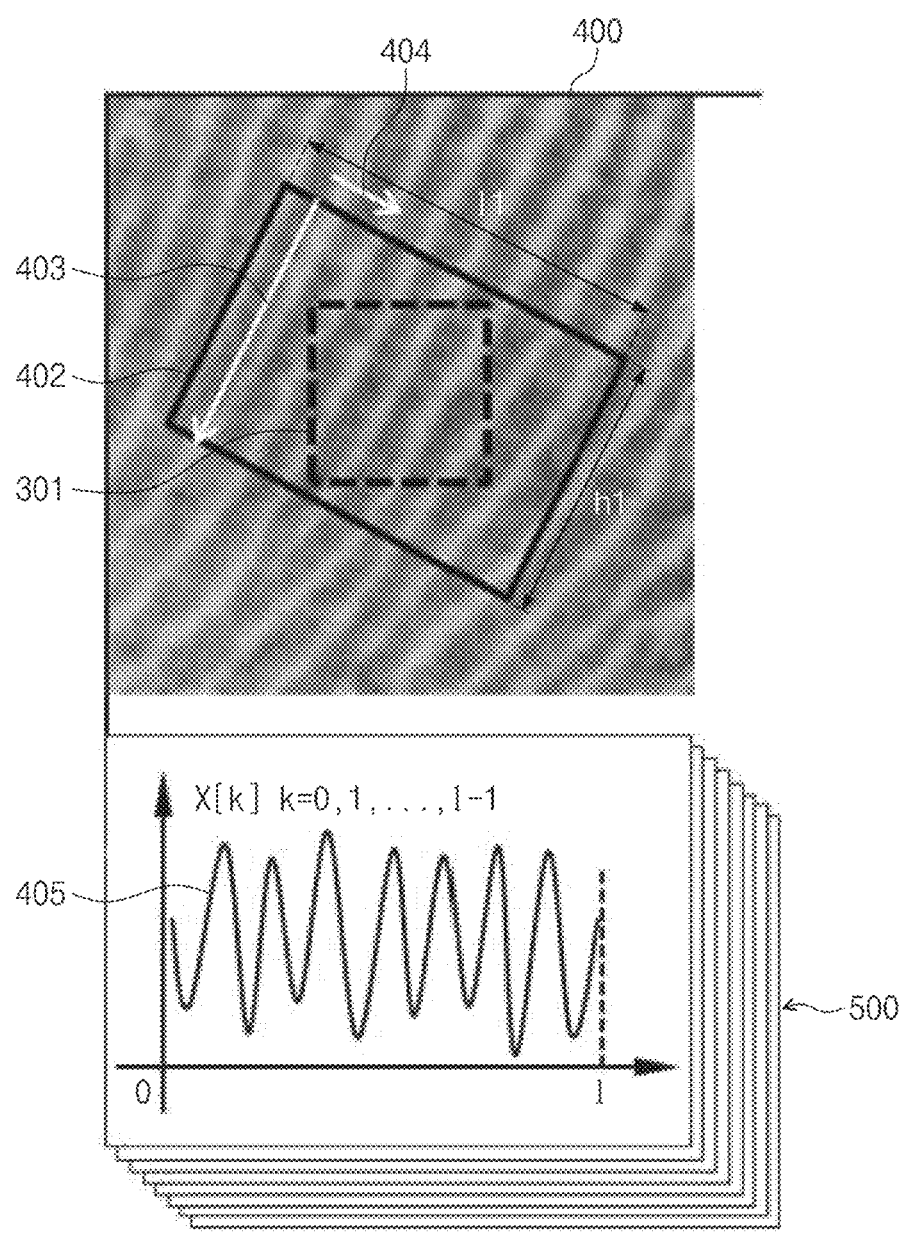
FIG. 7 illustrates an operation of a ridge-direction-component extraction unit, according to an embodiment of the present disclosure.
Figure 8A:
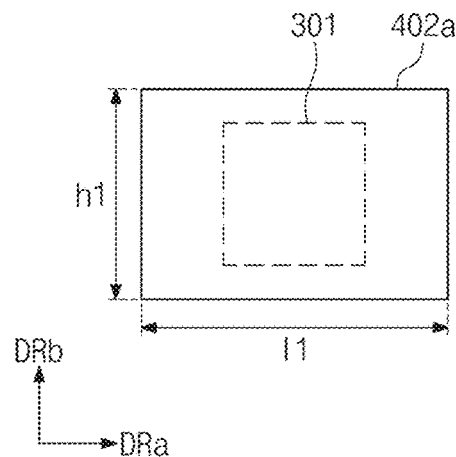
FIGS. 8A to 8H are diagrams illustrating a predetermined area, according to an embodiment of the present disclosure.
Figure 8B:
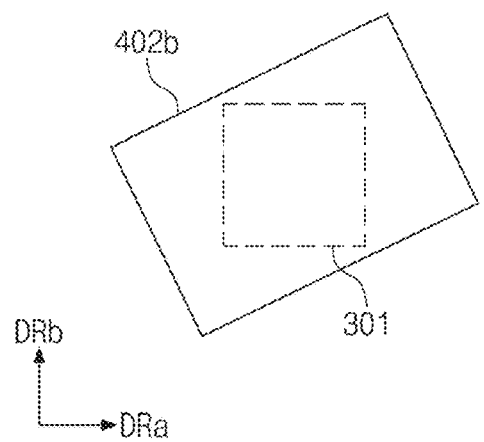
Figure 8C:
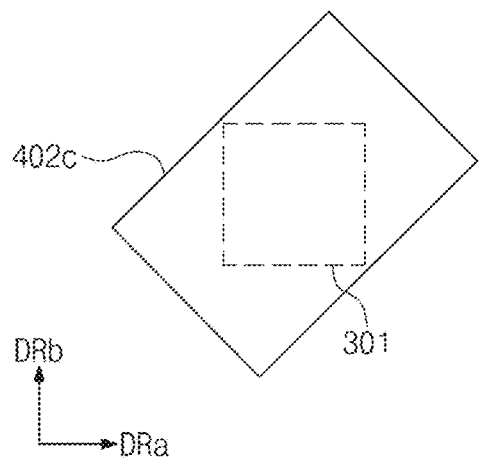
Figure 8D:
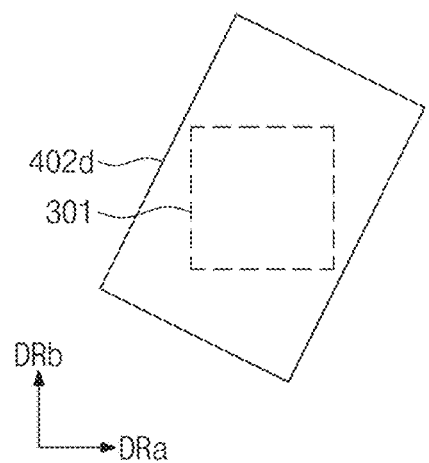
Figure 8E:
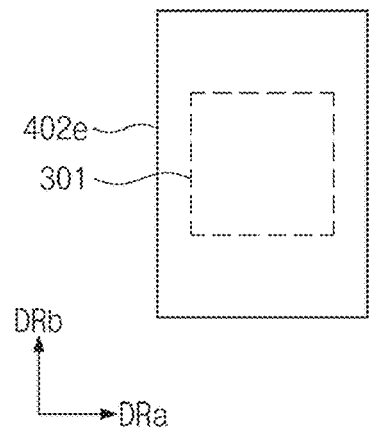
Figure 8F:
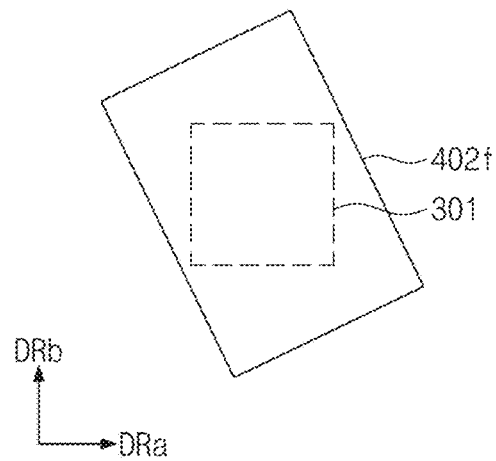
Figure 8G:
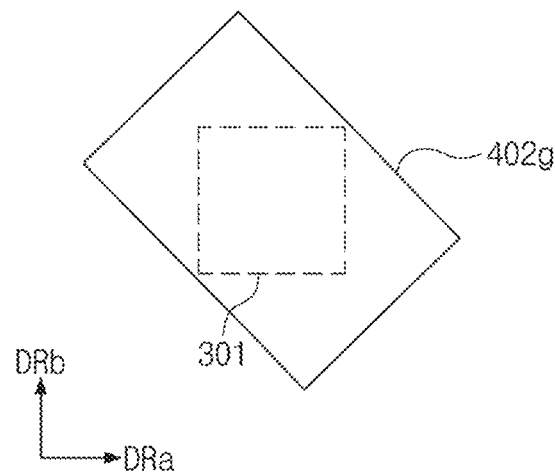
Figure 8H:
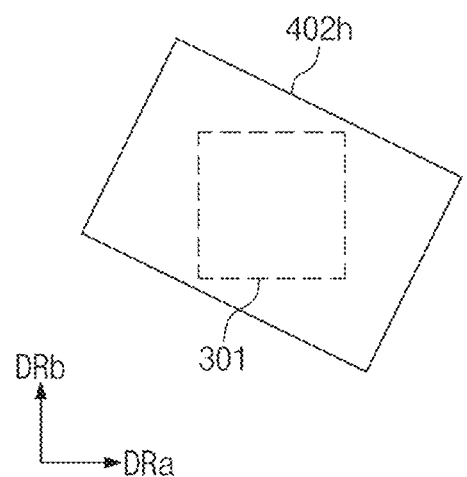
Figure 9A:
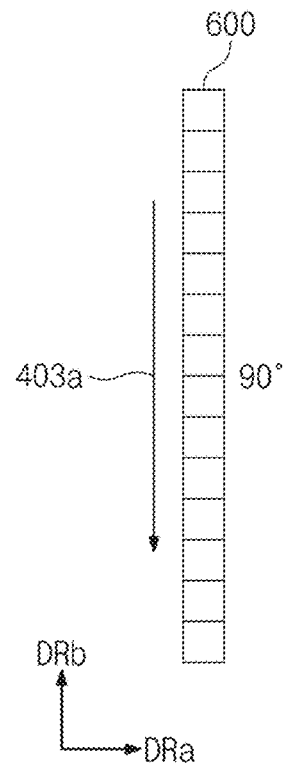
FIGS. 9A to 9H show pixels accumulated in a short-side direction, according to an embodiment of the present disclosure.
Figure 9B:
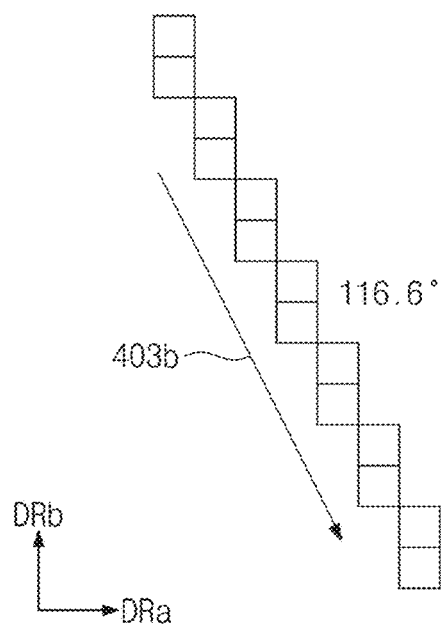
Figure 9C:
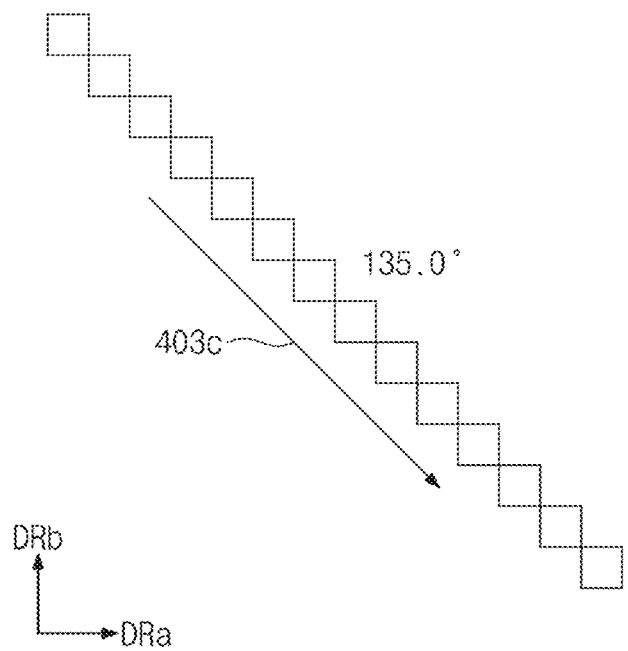
Figure 9D:
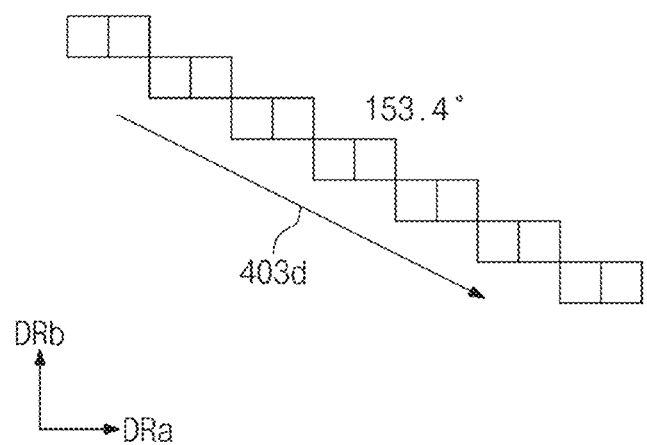
Figure 9E:
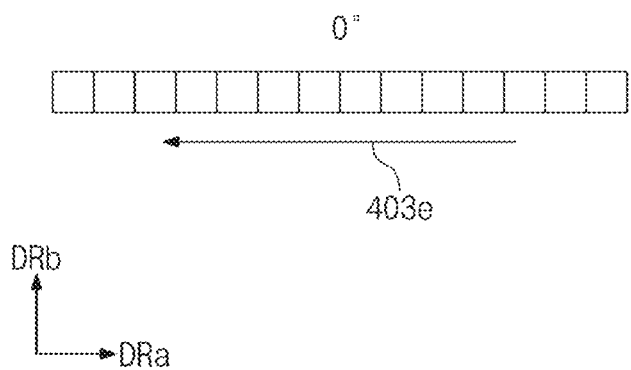
Figure 9F:
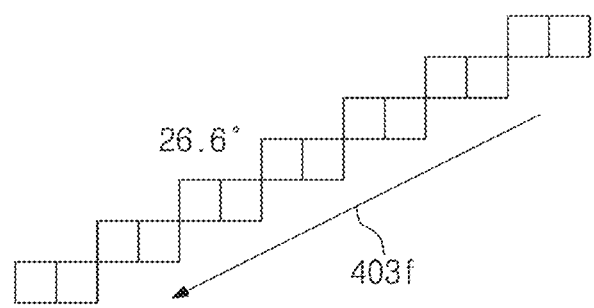
Figure 9G:
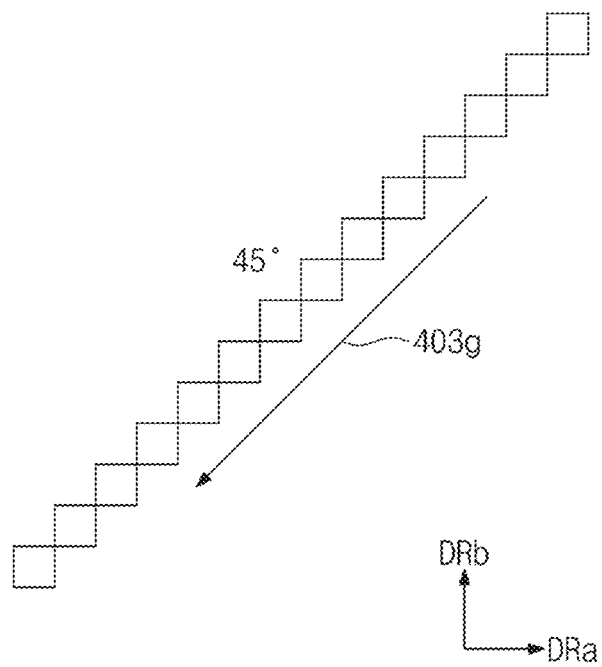
Figure 9H:
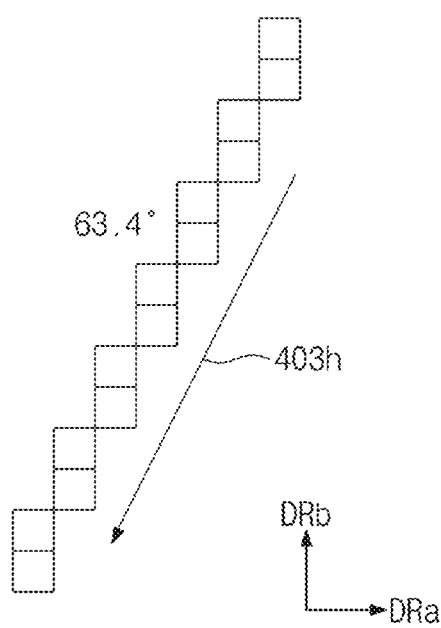
Figure 10A:
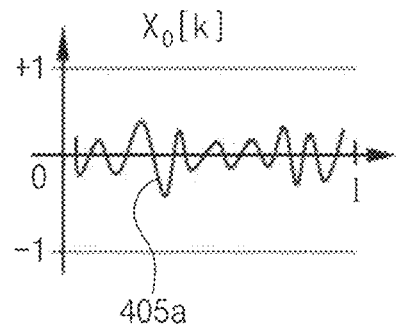
FIGS. 10A to 10H show 1D signals, according to an embodiment of the present disclosure.
Figure 10B:
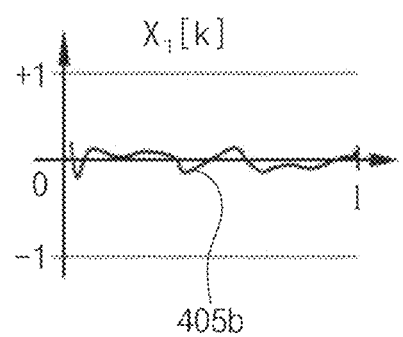
Figure 10C:
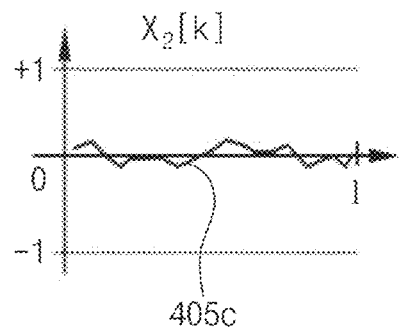
Figure 10D:
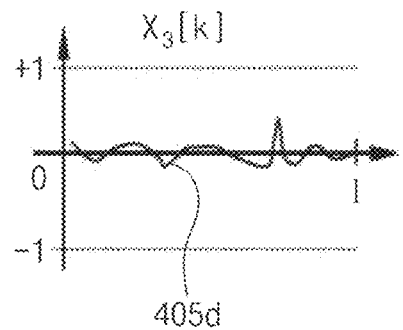
Figure 10E:
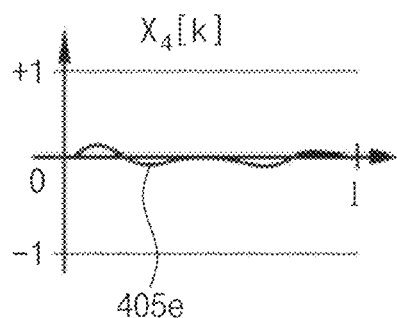
Figure 10F:
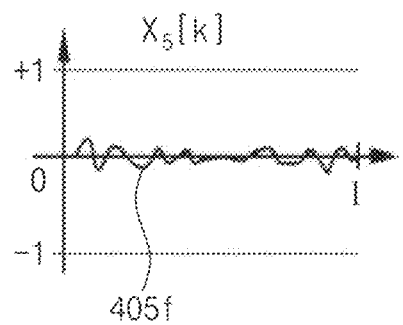
Figure 10G:
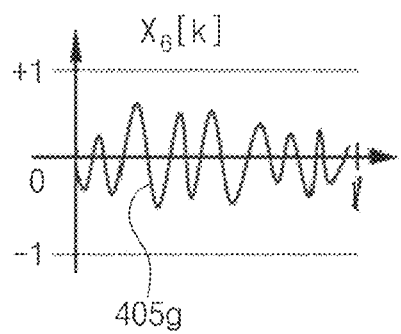
Figure 10H:
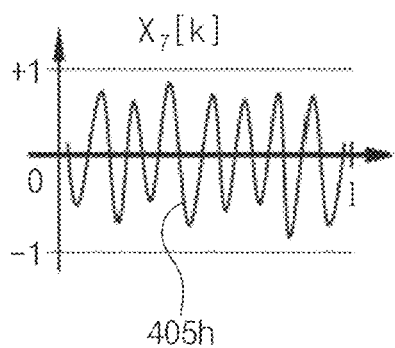

FIG. 7 illustrates an operation of a ridge-direction-component extraction unit, according to an embodiment of the present disclosure.

Referring to FIGS. 5 and 7, a fingerprint sensing signal FS output from the fingerprint sensing unit FSU (see FIG. 3) may include the fingerprint image 400. The fingerprint image 400 may be an image of a fingerprint captured by a plurality of pixels of the fingerprint sensing unit FSU (see FIG. 3).

In the fingerprint image 400, the split image 301 may be defined by the area division unit 110. The ridge-direction-component extraction unit 120 may output a signal to calculate the direction of a fingerprint ridge.

The ridge-direction-component extraction unit 120 may set a predetermined area 402 including the split image 301. The predetermined area 402 may have a third length l1 in a long-side direction 404 and may have a fourth length h1 in a short-side direction 403. The long-side direction 404 may be referred to as a "movement direction 404". The short-side direction 403 may be referred to as a "cumulative direction 403".

With respect to pixels within the predetermined area 402, pixel values for pixels in a section within the fourth length h1 in the short-side direction 403 may be accumulated. The ridge-direction-component extraction unit 120 may repeat the accumulation operation the number of times obtained by dividing the third length l1 into predetermined units in the long-side direction 404. In this way, the ridge-direction-component extraction unit 120 may output the 1D signal 405. That is, an x-axis (horizontal axis of the graph in FIG. 7) of the 1D signal 405 may be a corresponding location obtained by dividing the third length l1 by the predetermined unit, and a y-axis thereof (vertical axis of the graph in FIG. 7) may be a value obtained by adding pixel values accumulated by the pixel values in the section within the fourth length h1 in the short-side direction 403. The 1D signal 405 may be defined as a function of x[k]. In the case, 'k' may have a value of 0 to '1-1'. The 'l' may refer to the third length l1.

For example, when the short-side direction 403 matches the direction of a ridge, a value obtained by adding pixel values accumulated by the fourth length h1 may indicate a value close to +1 or −1. When the short-side direction 403 does not match the direction of the ridge, a value obtained by adding pixel values accumulated by the fourth length h1 may indicate a value close to 0. That is, as the cumulative direction 403 matches the direction of the ridge, the intensity of the 1D signal 405 may be increased.

The ridge-direction-component extraction unit 120 may extract the plurality of 1D signal 405 by rotating the predetermined area 402 multiple times at a predetermined angle about the center of the predetermined area 402. The plurality of 1D signals 500 may be provided to the estimation unit 130.

FIGS. 8A to 8H are diagrams illustrating a predetermined area, according to an embodiment of the present disclosure. FIGS. 9A to 9H show pixels accumulated in a short-side direction, according to an embodiment of the present disclosure. FIGS. 10A to 10H show 1D signals, according to an embodiment of the present disclosure.

FIGS. 9A to 9H show cumulative directions corresponding to FIGS. 8A to 8H, respectively. FIGS. 10A to 10H show 1D signals corresponding to FIGS. 8A to 8H, respectively.

Referring to FIGS. 5, 7, and 8A to 10H, the ridge-direction-component extraction unit 120 may set the predetermined areas 402a, 402b, 402c, 402d, 402e, 402f, 402g, and 402h including the split image 301. Each of the predetermined areas 402a, 402b, 402c, 402d, 402e, 402f, 402g, and 402h may have a rectangular shape having the third length l1 in a longitudinal direction and the fourth length h1 in a latitudinal direction. That is, the predetermined areas 402a, 402b, 402c, 402d, 402e, 402f, 402g, and 402h may have the same area as each other. However, this is an example. For example, according to another embodiment of the present disclosure, each of the third length l1 and the fourth length h1 may be provided in various ways based on a method of extracting the plurality of 1D signals 500 of the ridge-direction-component extraction unit 120.

The ridge-direction-component extraction unit 120 may set the predetermined areas 402a, 402b, 402c, 402d, 402e, 402f, 402g, and 402h, respectively, by rotating a reference predetermined area multiple times at a predetermined angle around the center of the reference predetermined area. The ridge-direction-component extraction unit 120 may extract the plurality of 1D signals 500 from the predetermined areas 402a, 402b, 402c, 402d, 402e, 402f, 402g, and 402h, respectively.

The predetermined areas 402a, 402b, 402c, 402d, 402e, 402f, 402g, and 402h may include the first area 402a, the second area 402b, the third area 402c, the fourth area 402d, the fifth area 402e, the sixth area 402f, the seventh area 402g, and the eighth area 402h.

The ridge-direction-component extraction unit 120 may define the first area 402a including the split image 301. In the first area 402a, the first cumulative direction 403a may have an angle of 90° with respect to a direction opposite to the first plane direction Dra in a counterclockwise direction.

The ridge-direction-component extraction unit 120 may accumulate a pixel value of each of a plurality of cumulative pixels 600 in the first cumulative direction 403a. The ridge-direction-component extraction unit 120 may repeat the accumulation operation the number of times obtained by dividing the third length l1 into predetermined units in the movement direction 404. In this way, the ridge-direction-component extraction unit 120 may output a first 1D signal 405a. The first 1D signal 405a may be defined as a function of $x_0[k]$.

When the ridge-direction-component extraction unit 120 completely processes the first area 402a, the ridge-direction-component extraction unit 120 may define the second area 402b by rotating the first area 402a at a predetermined angle around the center of the first area 402a.

In the second area 402b, the second cumulative direction 403b may have an angle of 116.6° with respect to the first plane direction DRa in the counterclockwise direction.

The ridge-direction-component extraction unit 120 may accumulate a pixel value of each of a plurality of cumulative pixels 600 in the second cumulative direction 403b. The ridge-direction-component extraction unit 120 may repeat the accumulation operation the number of times obtained by dividing the third length l1 into predetermined units in the movement direction 404. In this way, the ridge-direction-component extraction unit 120 may output a second 1D signal 405b. The second 1D signal 405b may be defined as a function of $x_1[k]$.

When an angle with respect to a direction opposite to the first plane direction DRa of the cumulative direction 403 (see FIG. 7) in the counterclockwise direction is inclined to have an acute or obtuse angle, unlike the present disclosure, the ridge-direction-component extraction unit 120 may accumulate a pixel value by performing linear combination with neighboring pixels of the cumulative pixel 600. In this case, the processing load of the cumulative pixel 600 may increase. As a result, the processing time may be increased. However, according to an embodiment of the present disclosure, the plurality of cumulative pixels 600 arranged in a stepwise manner as shown in FIGS. 9A to 9H may be designated in advance. The ridge-direction-component extraction unit 120 may easily accumulate pixel values of the designated cumulative pixels 600 without separate calculation. Accordingly, the electronic device DD (see FIG. 1) including the readout circuit ROC having high speed and high precision may be provided.

When the ridge-direction-component extraction unit 120 completely processes the second area 402b, the ridge-direction-component extraction unit 120 may define the third area 402c by rotating the second area 402b at a predetermined angle around the center of the second area 402b.

In the third area 402c, a third cumulative direction 403c may have an angle of 135.0° with respect to a direction opposite to the first plane direction DRa in a counterclockwise direction.

The ridge-direction-component extraction unit 120 may accumulate a pixel value of each of the plurality of cumulative pixels 600 in the third cumulative direction 403c. The ridge-direction-component extraction unit 120 may repeat the accumulation operation the number of times obtained by dividing the third length l1 into predetermined units in the movement direction 404. In this way, the ridge-direction-component extraction unit 120 may output a third 1D signal 405c. The third 1D signal 405c may be defined as a function of $x_2[k]$.

When the ridge-direction-component extraction unit 120 completely processes the third area 402c, the ridge-direction-component extraction unit 120 may define the fourth area 402d by rotating the third area 402c at a predetermined angle around the center of the third area 402c.

In the fourth area 402d, a fourth cumulative direction 403d may have an angle of 153.4° with respect to a direction opposite to the first plane direction DRa in the counterclockwise direction.

The ridge-direction-component extraction unit 120 may accumulate a pixel value of each of the plurality of cumulative pixels 600 in the fourth area 402d in the fourth cumulative direction 403d. The ridge-direction-component extraction unit 120 may repeat the accumulation operation the number of times obtained by dividing the third length l1 into predetermined units in the movement direction 404. In this way, the ridge-direction-component extraction unit 120 may output a fourth 1D signal 405d. The fourth 1D signal 405d may be defined as a function of $x_3[k]$.

When the ridge-direction-component extraction unit 120 completely processes the fourth area 402d, the ridge-direction-component extraction unit 120 may define the fifth area 402e by rotating the fourth area 402d at a predetermined angle around the center of the fourth area 402d.

In the fifth area 402e, a fifth cumulative direction 403e may have an angle of 0° with respect to a direction opposite to the first plane direction DRa in the counterclockwise direction. That is, the fifth cumulative direction 403e may be parallel to the opposite direction of the first plane direction DRa.

The ridge-direction-component extraction unit 120 may accumulate a pixel value of each of the plurality of cumulative pixels 600 in the fifth area 402e in the fifth cumulative direction 403e. The ridge-direction-component extraction unit 120 may repeat the accumulation operation the number of times obtained by dividing the third length 11 into predetermined units in the movement direction 404. In this way, the ridge-direction-component extraction unit 120 may output a fifth 1D signal 405e. The fifth 1D signal 405e may be referred to as a "function of $x_4[k]$".

When the ridge-direction-component extraction unit 120 completely processes the fifth area 402e, the ridge-direction-component extraction unit 120 may define the sixth area 402f by rotating the fifth area 402e at a predetermined angle around the center of the fifth area 402e.

In the sixth area 402f, a sixth cumulative direction 403f may have an angle of 26.6° with respect to a direction opposite to the first plane direction DRa in the counterclockwise direction.

The ridge-direction-component extraction unit 120 may accumulate a pixel value of each of the plurality of cumulative pixels 600 in the sixth area 402f in the sixth cumulative direction 403f. The ridge-direction-component extraction unit 120 may repeat the accumulation operation the number of times obtained by dividing the third length 11 into predetermined units in the movement direction 404. In this way, the ridge-direction-component extraction unit 120 may output a sixth 1D signal 405f. The sixth 1D signal 405f may be defined as a function of $x_5[k]$.

When the ridge-direction-component extraction unit 120 completely processes the sixth area 402f, the ridge-direction-component extraction unit 120 may define the seventh area 402g by rotating the sixth area 402f at a predetermined angle around the center of the sixth area 402f.

In the seventh area 402g, the seventh cumulative direction 403g may have an angle of 45° with respect to a direction opposite to the first plane direction DRa in the counterclockwise direction.

The ridge-direction-component extraction unit 120 may accumulate a pixel value of each of the plurality of cumulative pixels 600 in the seventh area 402g in the seventh cumulative direction 403g. The ridge-direction-component extraction unit 120 may repeat the accumulation operation the number of times obtained by dividing the third length 11 into predetermined units in the movement direction 404. In this way, the ridge-direction-component extraction unit 120 may output a seventh 1D signal 405g. The seventh 1D signal 405g may be defined as a function of $x_6[k]$.

When the ridge-direction-component extraction unit 120 completely processes the seventh area 402g, the ridge-direction-component extraction unit 120 may define the eighth area 402h by rotating the seventh area 402g at a predetermined angle around the center of the seventh area 402g.

In the eighth area 402h, an eighth cumulative direction 403h may have an angle of 63.4° with respect to a direction opposite to the first plane direction DRa in the counterclockwise direction.

The ridge-direction-component extraction unit 120 may accumulate a pixel value of each of the plurality of cumulative pixels 600 in the eighth area 402h in the eighth cumulative direction 403h. The ridge-direction-component extraction unit 120 may repeat the accumulation operation the number of times obtained by dividing the third length 11 into predetermined units in the movement direction 404. In this way, the ridge-direction-component extraction unit 120 may output an eighth 1D signal 405h. The eighth 1D signal 405h may be defined as a function of $x_7[k]$.

FIGS. 8A to 8H show the predetermined area 402 having eight patterns, but the number of patterns according to an embodiment of the present disclosure is not limited thereto and may be provided in various ways.

According to an embodiment of the present disclosure, the ridge-direction-component extraction unit 120 may reduce a processing load of the split image 301 by converting a 2D signal, which is an image, into the plurality of 1D signals 500. As a result, the processing time of the split image 301 may be shortened. Accordingly, the electronic device DD (see FIG. 1) including the readout circuit ROC having high speed and high precision may be provided.

The ridge-direction-component extraction unit 120 may output, to the estimation unit 130, the 1D signals 500 including the first to eighth 1D signals 405a, 405b, 405c, 405d, 405e, 405f, 405g, and 405h.

Figure 11:
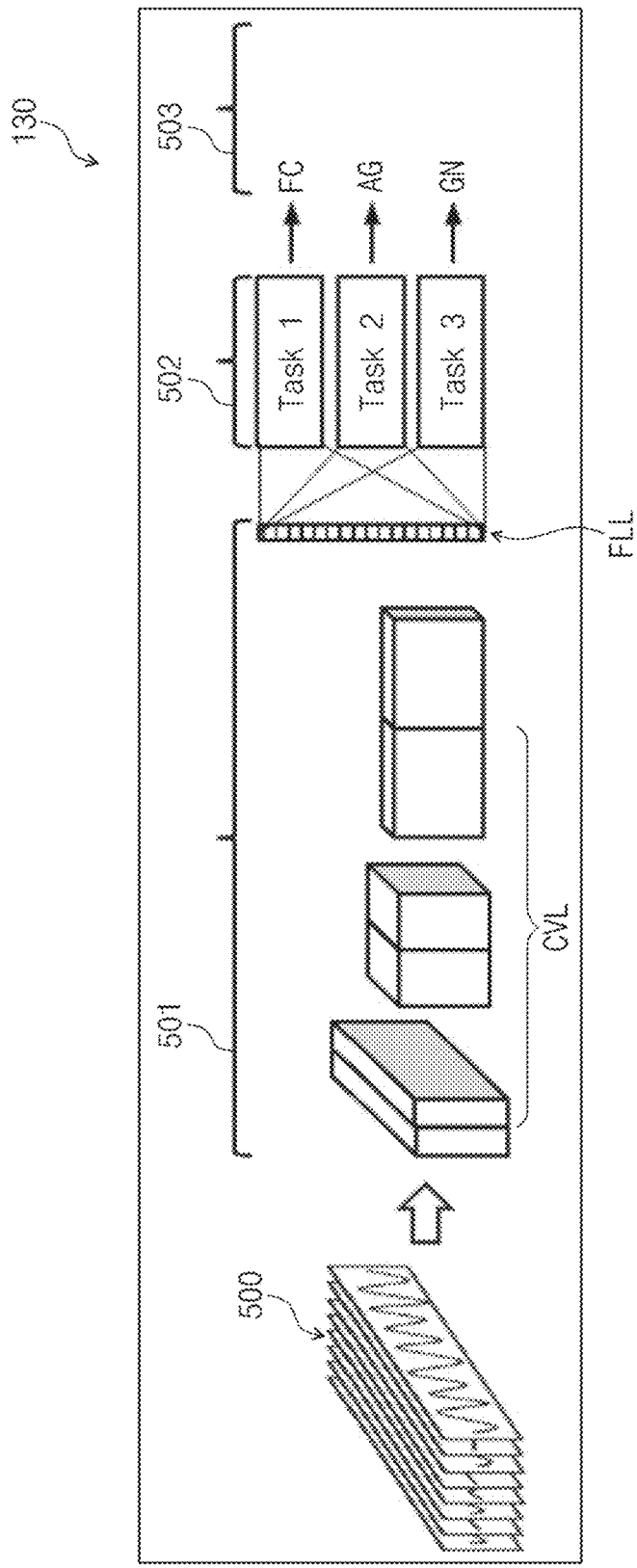
FIG. 11 is a block diagram showing a configuration of an estimation unit, according to an embodiment of the present disclosure.

FIG. 11 is a block diagram showing a configuration of an estimation unit, according to an embodiment of the present disclosure.

Referring to FIGS. 5 and 11, the estimation unit 130 may receive the plurality of 1D signals 500 from the ridge-direction-component extraction unit 120. The estimation unit 130 may output the estimation signal 503 based on the plurality of 1D signals 500. The estimation signal 503 may include the fingerprint feature FC, angle information AG, and image-quality information GN.

The estimation unit 130 may include a feature extraction layer 501 and a pre-combination layer 502.

The feature extraction layer 501 may include a CNN layer CVL and a flattening layer FLL.

The CNN layer CVL may receive the plurality of 1D signals 500. The CNN layer CVL may include a convolutional neural network (CNN).

The CNN layer CVL may consist of at least one feature map. The feature map may consist of a matrix with a predetermined size. The feature map may be generated as a result of performing an operation, to which a weight is applied, on a value of a previous layer. The feature map of the CNN layer CVL may be generated as a result of performing a convolution operation on the plurality of 1D signals 500 through a filter composed of a weight matrix.

The CNN layer CVL may output, to the flattening layer FLL, the result value obtained by applying a weight to the operation result through an activation function for the feature map. The activation function may include a leaky rectified linear unit ("LeakyReLU"). However, this is an example. For example, an activation function according to an embodiment of the present disclosure may be provided as various functions.

The flattening layer FLL may convert the shape of the previous layer to match the shape of the next layer. The flattening layer FLL may convert the feature map to have a column form depending on an operation node of the pre-combination layer 502.

The pre-combination layer 502 may include a plurality of operation nodes Task1, Task2, and Task3. A value of each of the plurality of operation nodes Task1, Task2, and Task3 may be output after a value of a feature map matrix is converted by the flattening layer FLL. The plurality of operation nodes Task1, Task2, and Task3 may output the estimation signal 503.

The plurality of operation nodes Task1, Task2, and Task3 may include the first operation node Task1, the second operation node Task2, and the third operation node Task3.

The first operation node Task1 may output the fingerprint feature FC. The fingerprint feature FC may include a first feature including a ridge extending in a specific direction, or a second feature including minutiae including central points, ridge ends of ridges, or bifurcations. For example, when the fingerprint feature FC is the first feature, 1 may be output. When the fingerprint feature FC is the second feature, 0 may be output.

The second operation node Task2 may output the angle information AG. When the fingerprint feature FC is the first feature, the angle information AG may be extracted. The angle information AG may include a vector component of the specific direction. The estimation unit 130 may calculate the direction of the fingerprint ridge based on the plurality of 1D signals 500.

The third operation node Task3 may output the image-quality information GN. The image-quality information GN may define the quality of the split image 301. For example, when the quality of the split image 301 is low, 0 may be output: when the quality of the split image 301 is normal, 1 may be output; and, when the quality of the split image 301 is high, 2 may be output.

When the fingerprint feature FC is the first feature, the first sharpening processing unit 140 may operate, and the second sharpening processing unit 150 may not operate. When the fingerprint feature FC is the first feature, the estimation unit 130 may provide the first sharpening processing unit 140 with the image-quality information GN and the split image 301.

When the fingerprint feature FC is the second feature, the second sharpening processing unit 150 may operate, and the first sharpening processing unit 140 may not operate. When the fingerprint feature FC is the second feature, the estimation unit 130 may provide the second sharpening processing unit 150 with the angle information AG, the image-quality information GN, and the split image 301.

Figure 12:
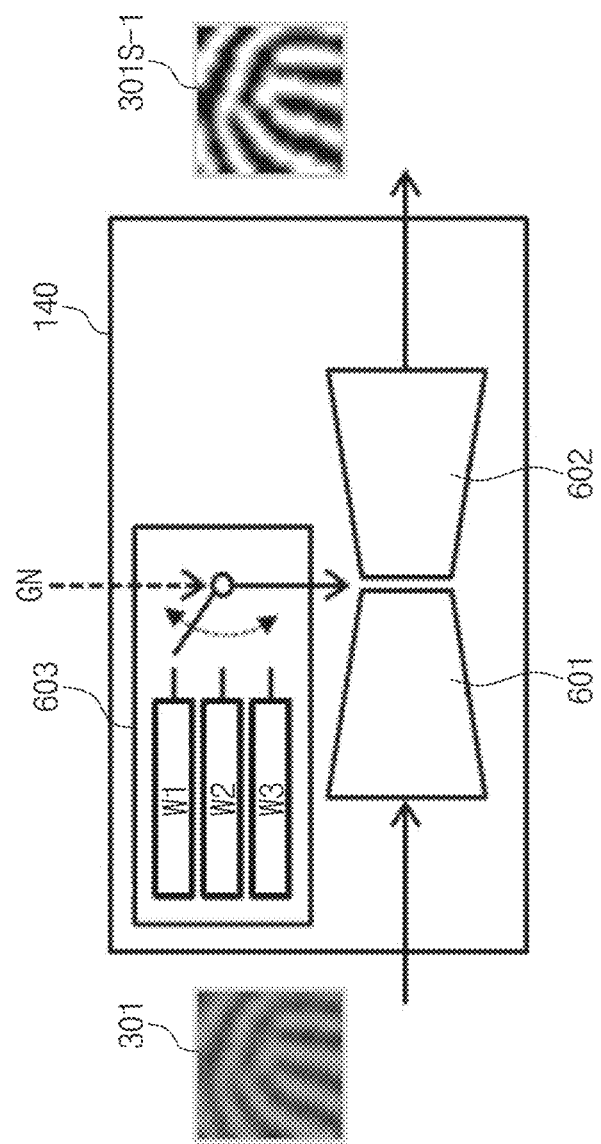
FIG. 12 is a block diagram illustrating a first sharpening processing unit, according to an embodiment of the present disclosure.

FIG. 12 is a block diagram illustrating a first sharpening processing unit, according to an embodiment of the present disclosure.

Referring to FIGS. 5 and 12, the first sharpening processing unit 140 may sharpen the split image 301 in a first method and may output the first image 301S-1. The first method may be referred to as a "method of sharpening the split image 301 through machine learning by using deep-learning".

The first sharpening processing unit 140 may include a convolutional neural network 601, a deconvolutional neural network 602, and a weight determination unit 603.

The convolutional neural network 601 may include a plurality of convolution layers for extracting at least one or more feature maps by performing convolution on the split image 301, and a pooling layer for down-sampling feature maps between the plurality of convolution layers.

The deconvolutional neural network 602 may obtain a determination split image for the split image 301 by using an image feature vector determined by the convolutional neural network 601. The deconvolutional neural network 602 may include a plurality of deconvolution layers for generating at least one or more intermediate split maps by performing deconvolution, and a plurality of unpooling layers for up-sampling intermediate split maps between the deconvolution layers.

The weight determination unit 603 may determine weights W1, W2, and W3 based on the image-quality information GN. The weights W1, W2, and W3 may include the first weight W1, the second weight W2, and the third weight W3. The weights W1, W2, and W3 may be applied to the convolutional neural network 601 and the deconvolutional neural network 602.

Figure 13:
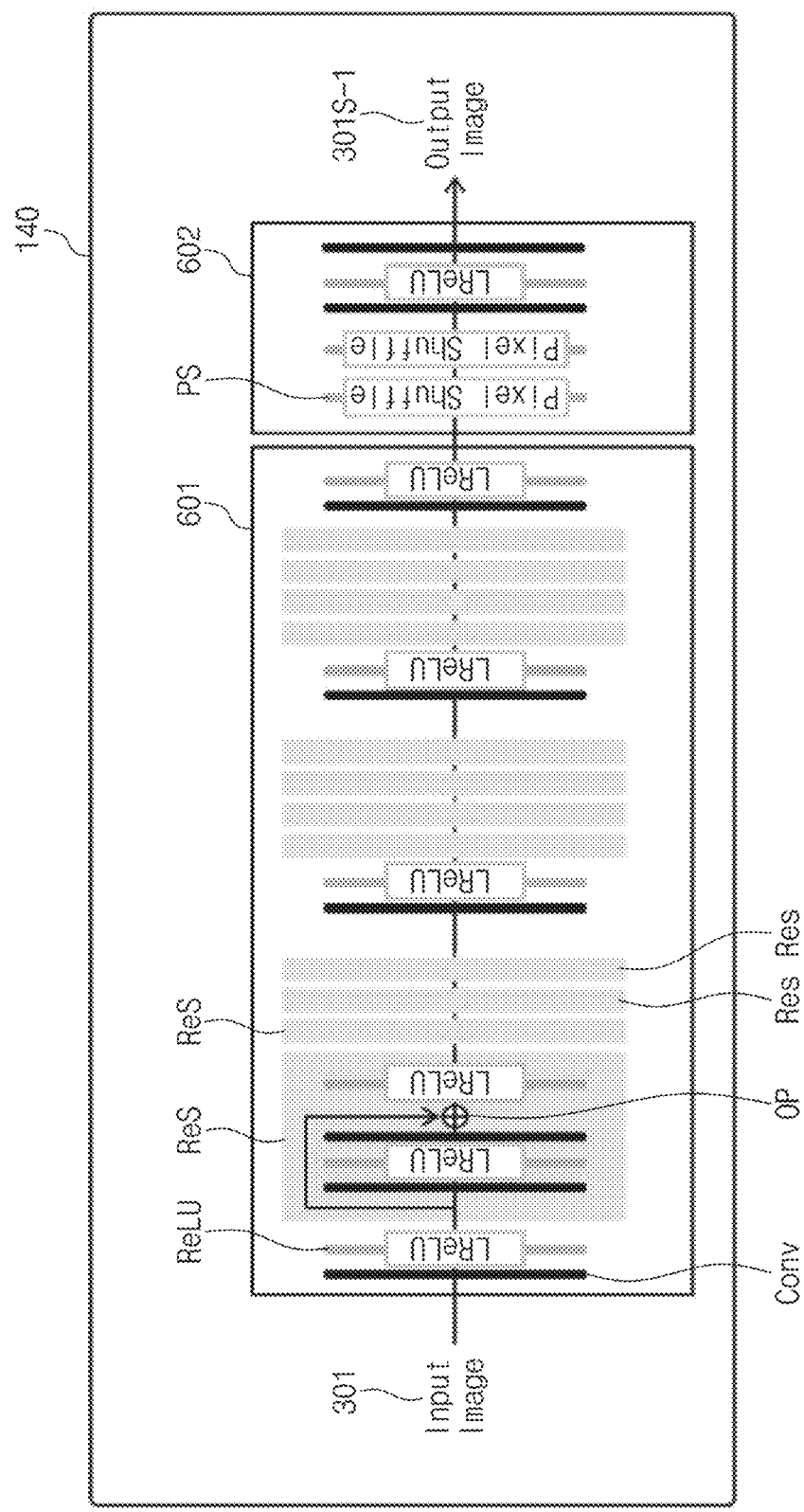
FIG. 13 is a block diagram illustrating a first sharpening processing unit, according to an embodiment of the present disclosure.

FIG. 13 is a block diagram illustrating a first sharpening processing unit, according to an embodiment of the present disclosure.

Referring to FIG. 13, the convolutional neural network 601 may secure invariance of a movement, a rotation, a size change, or the like of the split image 301 through down-sampling. As a result, the convolutional neural network 601 may generate an output image obtained by reducing the size of the split image 301 through down-sampling. For example, the split image 301 may be output such that a feature map scaled down by a factor of ¼ through the convolutional neural network 601 has 64 channels.

The split image 301 of 1 channel of a size having the first length 'W' in the first plane direction DRa and the second length 'H' in the second plane direction DRb may be input to the convolutional neural network 601. The split image 301 may be a 2D signal.

The convolutional neural network 601 may include a convolution operation Conv, a non-linearization operation ReLU, four residual blocks Res, the convolution operation Conv, the non-linearization operation ReLU, and the four residual blocks Res, the convolution operation Conv, the non-linearization operation ReLU, the four residual blocks Res, the convolution operation Conv, and the non-linearization operation ReLU that are arranged in this order.

The convolution operation Conv may include a 3×3 convolution layer.

The non-linearization operation ReLU may include a rectified linear unit.

The residual block Res may include the at least one convolution operation Conv, the at least one non-linearization operation ReLU, and an operator OP.

The residual block Res may output a third value that is the sum of a first value and a second value, which is obtained by performing the convolution operation Conv at least once, the non-linearization operation ReLU at least once, and the convolution operation Conv at least once on the first value input to the residual block Res, through the operator OP and may output a fourth value obtained by performing the non-linearization operation ReLU on the third value at least once.

The split image 301 may be output such that a feature map obtained through the first convolution operation Conv and the first non-linearization operation ReLU has 4 channels. Afterward, the split image 301 may be output such that a feature map, of which the size is scaled down by a factor of ½ through the second convolution operation Conv and the second non-linearization operation ReLU, has 8 channels. Afterward, the split image 301 may be output such that a feature map, of which the size is scaled down by a factor of ¼ through the third convolution operation Conv and the third non-linearization operation ReLU has 16 channels. Afterward, the split image 301 may be output such that a feature map, of which the size is scaled down by a factor of ¼ through the fourth convolution operation Conv and the fourth non-linearization operation ReLU has 64 channels.

The deconvolutional neural network 602 may generate an output image as the first image 301S-1 having a size corresponding to the split image 301 through up-sampling. For example, the feature map reduced by the convolutional neural network 601 may be scaled up by a factor of 4 through the deconvolutional neural network 602 to obtain the sharpened first image 301S-1 having the original size.

A feature map output by the convolutional neural network 601 may be input to the deconvolutional neural network 602. The deconvolutional neural network 602 may include a plurality of pixel shuffles PS, the convolution operation Conv, the non-linearization operation ReLU, and the convolution operation Conv that are arranged in order.

The two pixel shuffles PS may be provided. Each of the plurality of pixel shuffles PS may be expanded by combining a plurality of channels. The split image 301 may be output such that a feature map, of which the size is scaled down by a factor of ¼ has 64 channels, and the split image 301 may be output such that a feature map, of which the size is scaled up through the first pixel shuffle PS by a factor of ½ has 16 channels. Afterward, the split image 301 may be output such that a feature map, of which the size is scaled up through the second pixel shuffle PS to the original size has 4 channels. Afterward, the split image 301 may be output such that a feature map, of which the size is scaled up through the convolution operation Conv and the non-linearization operation ReLU to the original size has 4 channels. Afterward, the first image 301S-1 of 1 channel of a size having the first length 'W' in the first plane direction DRa and the second length 'H' in the second plane direction DRb may be output through the convolution operation Conv.

Figure 14:
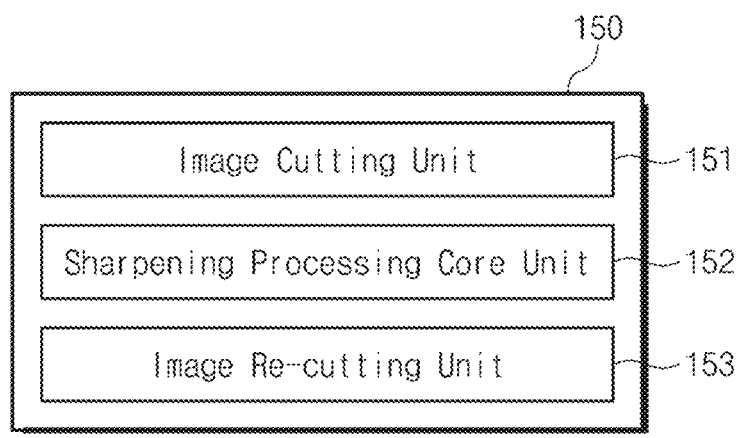
FIG. 14 is a block diagram illustrating a second sharpening processing unit, according to an embodiment of the present disclosure.

FIG. 14 is a block diagram illustrating a second sharpening processing unit, according to an embodiment of the present disclosure.

Referring to FIGS. 5 and 14, the second sharpening processing unit 150 may sharpen the split image 301 in a second method and may output a second image 301S-2. The second method may be referred as to a "method of sharpening the split image 301 by using simple mathematical expressions". The second method may have a smaller processing load of the readout circuit ROC than the first method. Accordingly, when the second method is used, the processing speed of the readout circuit ROC may be improved compared to the first method.

The second sharpening processing unit 150 may receive the angle information AG and the image-quality information GN from the estimation unit 130.

The second sharpening processing unit 150 may include an image cutting unit 151, a sharpening processing core unit 152, and an image re-cutting unit 153. The second sharpening processing unit 150 may receive the fingerprint image 400 and the split image 301.

Figure 15:
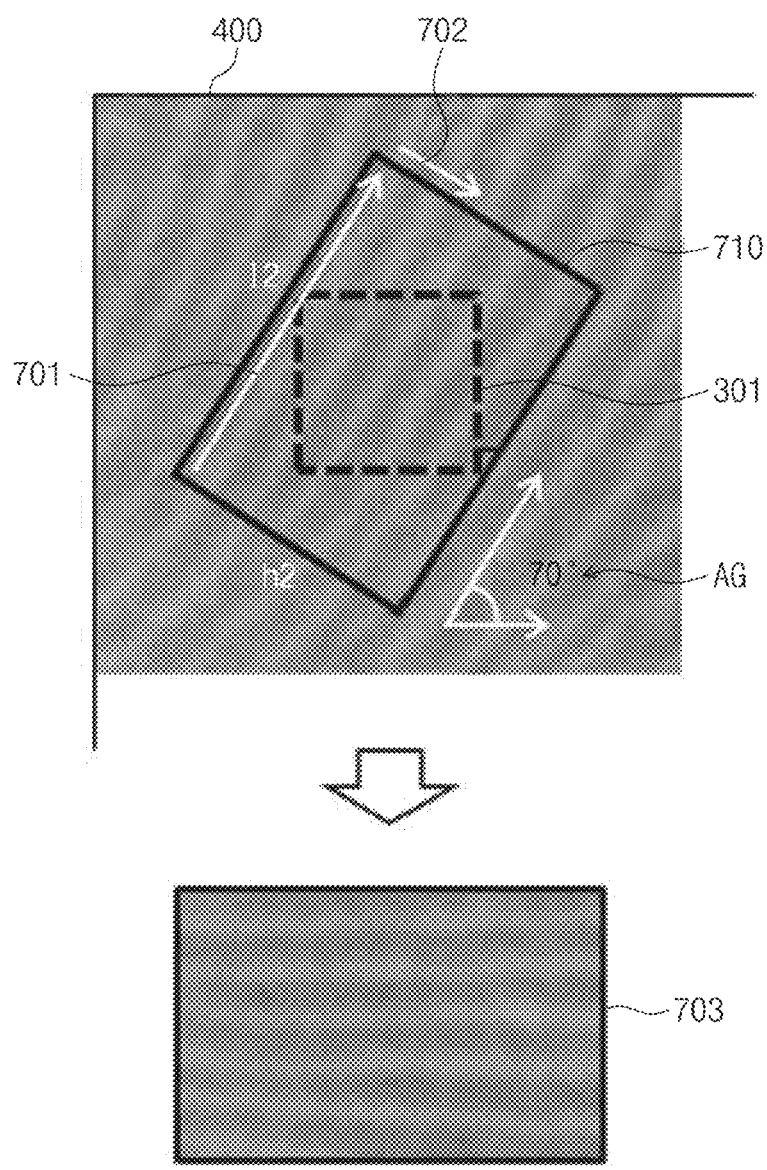
FIG. 15 illustrates an operation of an image cutting unit, according to an embodiment of the present disclosure.

FIG. 15 illustrates an operation of an image cutting unit, according to an embodiment of the present disclosure.

Referring to FIGS. 14 and 15, the image cutting unit 151 may set a predetermined slope area 710 including the split image 301 based on the angle information AG.

The predetermined area 710 may have a fifth length 12 in a long-side direction 701 and may have a sixth length h2 in a short-side direction 702.

The cutting image 703 may be output by setting the ridge direction of the slope area 710 to be horizontal.

The cutting image 703 may be output by extracting a pixel signal having the fifth length 12 by using linear interpolation in the long-side direction 701 and repeating the extraction operation the number of times obtained by dividing the sixth length h2 into predetermined units during a movement in the short-side direction 702.

Figure 16:
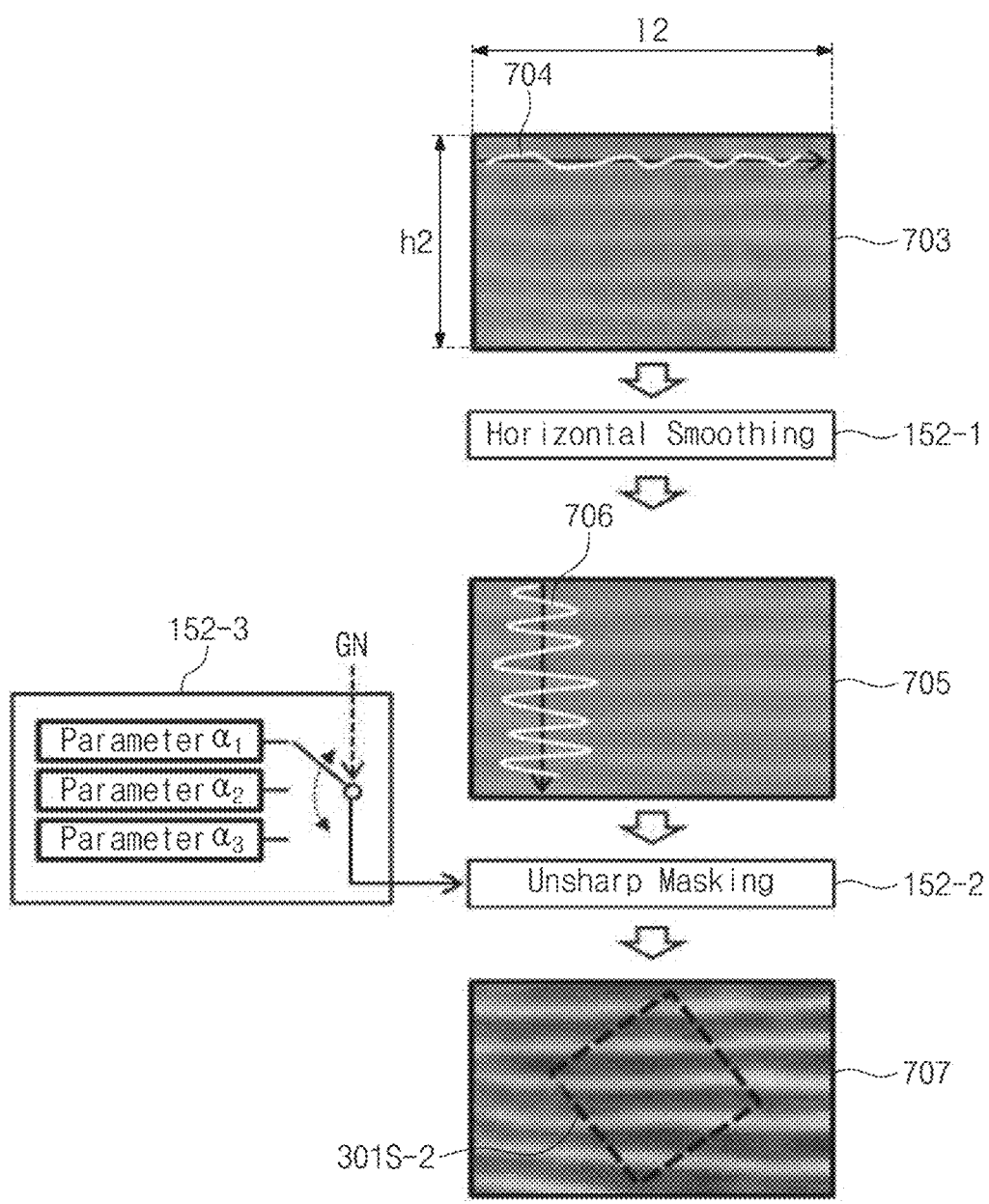
FIG. 16 illustrates an operation of a sharpening processing core unit, according to an embodiment of the present disclosure.

FIG. 16 illustrates an operation of a sharpening processing core unit, according to an embodiment of the present disclosure.

Referring to FIGS. 5 and 14 to 16, the sharpening processing core unit 152 may include a smoothing processing unit 152-1, a sharpening processing unit 152-2, and a parameter selection unit 152-3.

The smoothing processing unit 152-1 may receive the cutting image 703.

The smoothing processing unit 152-1 may perform smoothing processing to reduce noise of a horizontal line signal 704 of the cutting image 703 in a horizontal direction of the cutting image 703.

[Equation 1]

$$SigH_{smooth}(x_{i+N/2}, y) = \frac{K \cdot SigH(x_{i+N/2}, y) + \sum_{k=0}^{N-1} SigH(x_{i+k}, y)}{K + N} \quad (1)$$

In Equation 1, the horizontal line signal 704 may be defined as SigH(x,y). For example, the smoothing processing may be performed on the horizontal line signal 704 based on Equation 1. Here, the 'i' may have a range of 0 to 12-N: the 'N' may denote the size of a smoothing window; and, the 'K' may denote a weight. In Equation 1, the smoothing processing may be defined as $SigH_{smooth}(x,y)$. However, this is an example. For example, the smoothing processing is not limited to Equation 1, and may be performed through various smoothing algorithms.

The smoothing processing unit 152-1 may output a horizontal smoothing image 705 based on the horizontal line signal 704 that has been smoothed.

According to an embodiment of the present disclosure, the cutting image 703 may be output by setting the ridge direction to be horizontal by the image cutting unit 151, a direction of the horizontal line signal 704 may be parallel to the ridge direction. While the sharpness of the fingerprint ridge is maintained when the horizontal line signal 704 is smoothed, noise of the horizontal smoothing image 705 may be reduced. Accordingly, the electronic device 1000 including the readout circuit ROC (see FIG. 3) having improved reliability may be provided.

The sharpening processing unit 152-2 may receive the horizontal smoothing image 705.

The sharpening processing unit 152-2 may perform sharpening processing on a vertical line signal 706 of the horizontal smoothing image 705 based on parameters $a_1$, $a_2$, and as in the vertical direction of the horizontal smoothing image 705.

The parameter selection unit 152-3 may adjust the parameters $a_1$, $a_2$, and as of sharpening processing based on the image-quality information GN. For example, when contrast quality in the image-quality information GN is low, the parameters $a_1$, $a_2$, and $a_3$ may have high values. When contrast quality in the image-quality information GN is high, the parameters $a_1$, $a_2$, and as may have low values.

$$SigV_{unsharp}(x, y_{i+N/2}) = \quad [\text{Equation 2}]$$
$$SigV(x, y_{i+N/2}) + a_m(SigV(x, y_{i+N/2}) - SigV_{smooth}(x, y_{i+N/2}))$$

In Equation 2, the vertical line signal 706 may be defined as SigV(x,y). The sharpening processing may be performed on the vertical line signal 706 based on Equation 2. In this case, 'i' has a value of "h2-N" at 0. Moreover, 'm' has a value of 1, 2, or 3.

In Equation 2, the sharpening process may be defined as $SigV_{unsharp}(x,y)$. However, this is an example. For example, the sharpening processing is not limited to Equation 2, and may be performed through various sharpening algorithms.

The sharpening processing unit 152-2 may output the sharpening image 707 based on the vertical line signal 706 that is sharpened. The sharpening image 707 may include the second image 301S-2.

Unlike the present disclosure, the readout circuit ROC may output the fingerprint image 400 as the fingerprint authentication signal AUTH by using a 2D Fourier transform and a deep learning technology. In this case, the 2D Fourier transform and deep learning technology may be methods having a relatively high processing load. However, according to an embodiment of the present disclosure, when a fingerprint of a split image 301 has the shape of a ridge extending in a specific direction, the second sharpening processing unit 150 may output the sharpened image 301S through a smoothing and sharpening algorithm with a processing load lower than a 2D Fourier transform and a deep learning technology. The first sharpening processing unit 140 outputs the sharpened image 301S by using the deep learning technology, but the frequency of processing using the deep learning technology may be reduced by being applied only when the fingerprint of the split image 301 includes minutiae. As a result, the processing time of the sharpened image 301S may be shortened. Accordingly, the electronic device DD (see FIG. 1) including the readout circuit ROC having high speed and high precision may be provided.

Figure 17:
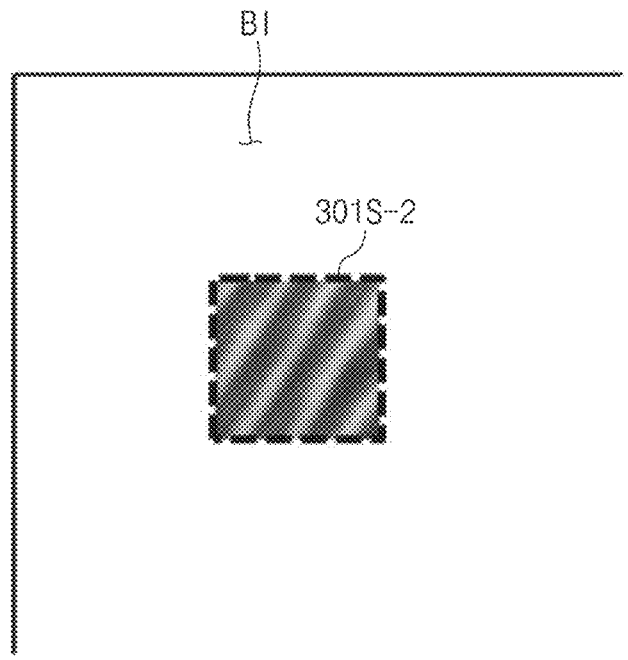
FIG. 17 illustrates an operation of an image re-cutting unit, according to an embodiment of the present disclosure.

FIG. 17 illustrates an operation of an image re-cutting unit, according to an embodiment of the present disclosure.

Referring to FIGS. 4, 5, 14, and 17, the image re-cutting unit 153 may output the second image 301S-2 corresponding to the split image 301 based on the sharpening image 707.

The memory MM may be connected to the readout circuit ROC. The buffer image BI may be stored in the memory MM. The buffer image BI may be initialized when the fingerprint processing operation starts.

The second image 301S-2 may be stored in an area corresponding to the split image 301 of the buffer image BI.

The first image 301S-1 and the second image 301S-2 may be stored in the buffer image BI.

With respect to all split images of the fingerprint area 300 (see FIG. 6A), the first image 301S-1 or the second image 301S-2 may be stored in the buffer image BI. Afterward, the processing unit 160 may operate. For example, all the sharpened images 301S for each of the plurality of split images 301a, 301b, 301c, 301d, 301e, 301f, 301g, 301h, 301i, 301j, 301k, and 3101 (see FIGS. 6A to 6L) are stored in the buffer image BI, the processing unit 160 may operate.

Figure 18:
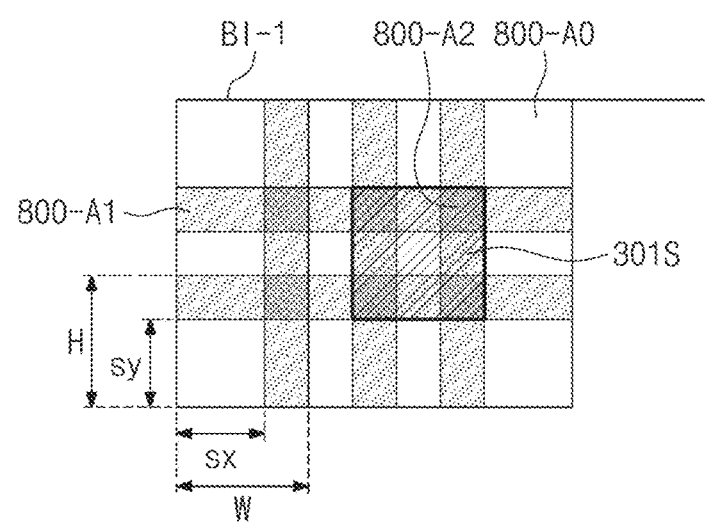
FIG. 18 illustrates an operation of a processing unit, according to an embodiment of the present disclosure.

FIG. 18 illustrates an operation of a processing unit, according to an embodiment of the present disclosure. In the description of FIG. 18, the same reference numerals are assigned to the same components described with reference to FIG. 6A, and thus the descriptions thereof are omitted to avoid redundancy.

Referring to FIGS. 5 and 18, the processing unit 160 may synthesize the first image 301S-1 and the second image 301S-2 that are stored in the buffer image BI. The processing unit 160 may generate a fingerprint processing signal BI-1 by synthesizing the sharpened image 301S. The fingerprint processing signal BI-1 may be a sharpened fingerprint image corresponding to the fingerprint area 300.

FIG. 18 shows the one sharpened image 301S. However, in the fingerprint processing signal BI-1, the first image 301S-1 or the second image 301S-2 may be stored in the buffer image BI with respect to all the split images.

The first correction area 800-A0 may be an area where the first image 301S-1 does not overlap the second image 301S-2. The processing unit 160 may not correct the first correction area 800-A0. The first correction area 800-A0 may be an area displayed in white in the fingerprint processing signal BI-1.

The second correction area 800-A1 may be an area where the first image 301S-1 doubly overlaps the second image 301S-2. The processing unit 160 may correct the second correction area 800-A1 to have a value of ½. The second correction area 800-A1 may be an area displayed in light gray in the fingerprint processing signal BI-1.

The third correction area 800-A2 may be an area where the first image 301S-1 overlaps the second image 301S-2 in quadruplicate. The processing unit 160 may correct the third correction area 800-A2 to have a value of ¼. The third correction area 800-A2 may be an area displayed in dark gray in the fingerprint processing signal BI-1.

The processing unit 160 may generate a fingerprint processing signal BI-1 by synthesizing the at least one sharpened image 301S. The fingerprint processing signal BI-1 may be a sharpened fingerprint image corresponding to the fingerprint area 300.

The readout circuit ROC (see FIG. 4) may generate the fingerprint processing signal BI-1 based on the fingerprint sensing signal FS (see FIG. 4) and may determine whether the fingerprint processing signal BI-1 matches the stored fingerprint signal FI, by comparing the fingerprint processing signal BI-1 with the stored fingerprint signal FI.

According to an embodiment of the present disclosure, the readout circuit ROC (see FIG. 4) may easily determine whether the sharpened fingerprint image synthesized by the processing unit 160 matches the fingerprint signal FI stored in the memory MM (see FIG. 4), by comparing the sharpened fingerprint image with the stored fingerprint signal FI. Accordingly, the readout circuit ROC (see FIG. 4) having improved reliability and the electronic device DD (see FIG. 1) including the same may be provided.

Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, when a fingerprint of a split image has the shape of a ridge extending in a specific direction, a second sharpening processing unit may output a sharpened image through a smoothing and sharpening algorithm with a processing load lower than a 2D Fourier transform and a deep learning technology. A first sharpening processing unit outputs a sharpened image by using the deep learning technology, but the frequency of processing using the deep learning technology may be reduced by being applied only when the fingerprint of a split image includes minutiae. As a result, the processing time of the sharpened image may be shortened. Accordingly, an electronic device including a readout circuit having high speed and high precision may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A fingerprint authentication device comprising:
   a fingerprint sensing unit configured to sense a fingerprint including a ridge and a valley and to output a fingerprint sensing signal including a fingerprint image; and
   a readout circuit configured to generate a fingerprint processing signal based on the fingerprint sensing signal and to determine whether the fingerprint processing signal matches a stored fingerprint signal, by comparing the fingerprint processing signal with the stored fingerprint signal, wherein the readout circuit includes:

an area division unit configured to divide at least part of the fingerprint image into a plurality of split images and to output the plurality of split images;

a ridge-direction-component extraction unit configured to convert a 2-dimensional (2D) signal of one split image among the plurality of split images into a 1-dimensional (1D) signal and to output the 1D signal;

an estimation unit configured to estimate a fingerprint feature including a first feature including the ridge extending in a specific direction or a second feature including minutiae of the fingerprint based on the 1D signal and to output an estimation signal including the fingerprint feature;

a first sharpening processing unit configured to output a first image by sharpening the one split image in a first method when the fingerprint feature is the first feature;

a second sharpening processing unit configured to output a second image by sharpening the one split image in a second method different from the first method when the fingerprint feature is the second feature; and a processing unit configured to determine whether the fingerprint sensing signal matches the stored fingerprint signal, based on the first image and the second image.

2. The fingerprint authentication device of claim 1, wherein the ridge-direction-component extraction unit sets a predetermined area including the one split image and extracts the 1D signal to be provided in plurality by rotating the predetermined area multiple times at a predetermined angle about a center of the predetermined area.

3. The fingerprint authentication device of claim 1, wherein the estimation unit further estimates an angle information of the specific direction and image-quality information of the one split image, and wherein the estimation signal further includes the angle information and the image-quality information.

4. The fingerprint authentication device of claim 3, wherein the estimation unit includes a convolutional neural network (CNN) layer.

5. The fingerprint authentication device of claim 3, wherein the first sharpening processing unit includes a convolutional neural network, a deconvolutional neural network, and a weight determination unit.

6. The fingerprint authentication device of claim 5, wherein the weight determination unit determines a weight based on the image-quality information.

7. The fingerprint authentication device of claim 3, wherein the second sharpening processing unit includes:

an image cutting unit;

a sharpening processing core unit configured to adjust a parameter of sharpening processing based on the image-quality information; and an image re-cutting unit.

8. The fingerprint authentication device of claim 7, wherein the image cutting unit sets a predetermined slope area including the one split image based on the angle information and outputs a cutting image by setting a ridge direction of the slope area to be horizontal.

9. The fingerprint authentication device of claim 8, wherein the sharpening processing core unit includes:

a smoothing processing unit configured to perform smoothing processing which reduces noise of the cutting image in a horizontal direction of the cutting image and to output a horizontal smoothing image; and a sharpening processing unit configured to output a sharpening image by performing sharpening processing based on the parameter in a vertical direction of the horizontal smoothing image.

10. The fingerprint authentication device of claim 9, wherein the image re-cutting unit outputs the second image corresponding to the one split image based on the sharpening image.

11. The fingerprint authentication device of claim 1, further comprising:

a memory connected to the readout circuit, wherein the first image and the second image are stored in a buffer image stored in the memory.

12. The fingerprint authentication device of claim 1, wherein the processing unit generates the fingerprint processing signal by synthesizing the first image and the second image.

13. An electronic device comprising:

a display unit configured to display an image;

a fingerprint sensing unit configured to sense a fingerprint including a ridge and a valley and to output a fingerprint sensing signal including a fingerprint image;

a readout circuit configured to generate a fingerprint processing signal based on the fingerprint sensing signal and to determine whether the fingerprint processing signal matches a stored fingerprint signal, by comparing the fingerprint processing signal with the stored fingerprint signal; and a memory connected to the readout circuit, wherein the readout circuit includes:

an area division unit configured to divide at least part of the fingerprint image into a plurality of split images and to output one split image among the plurality of split images;

a ridge-direction-component extraction unit configured to convert a 2D signal of the one split image into a 1D signal and to output the 1D signal;

an estimation unit configured to estimate a fingerprint feature including a first feature including the ridge extending in a specific direction or a second feature including minutiae of the fingerprint based on the 1D signal and to output an estimation signal including the fingerprint feature;

a first sharpening processing unit configured to output a first image by sharpening the one split image in a first method when the fingerprint feature is the first feature;

a second sharpening processing unit configured to output a second image by sharpening the one split image in a second method different from the first method when the fingerprint feature is the second feature; and a processing unit configured to determine whether the fingerprint sensing signal matches the stored fingerprint signal, based on the first image and the second image.

14. The electronic device of claim 13, wherein the ridge-direction-component extraction unit sets a predetermined area including the one split image and extracts the 1D signal to be provided in plurality by rotating the predetermined area multiple times at a predetermined angle about a center of the predetermined area.

15. The electronic device of claim 13, wherein the estimation unit further estimates an angle information of the specific direction and image-quality information of the one split image, and wherein the estimation signal further includes the angle information and the image-quality information.

16. The electronic device of claim 15, wherein the estimation unit includes a CNN layer.

17. The electronic device of claim 15, wherein the first sharpening processing unit includes a convolutional neural network, a deconvolutional neural network, and a weight determination unit, and
   wherein the weight determination unit determines a weight based on the image-quality information.

18. The electronic device of claim 15, wherein the second sharpening processing unit includes:
   an image cutting unit configured to set a predetermined slope area including the one split image based on the angle information and to output a cutting image by setting a ridge direction of the slope area to be horizontal;
   a sharpening processing core unit configured to adjust a parameter of sharpening processing based on the image-quality information, to perform smoothing processing which reduces noise of the cutting image in a horizontal direction of the cutting image, to perform sharpening processing based on the parameter in a vertical direction of the cutting image, and to output a sharpening image; and
   an image re-cutting unit configured to output the second image corresponding to the one split image based on the sharpening image.

19. The electronic device of claim 13, wherein the first image and the second image are stored in the memory.

20. The electronic device of claim 19, wherein the processing unit generates the fingerprint processing signal by synthesizing the first image and the second image.

* * * * *